United States Patent
Park et al.

(10) Patent No.: US 11,379,798 B2
(45) Date of Patent: Jul. 5, 2022

(54) IDENTIFICATION AND SURFACING OF CONTEXTUAL DATA RELATED TO ELECTRONIC CALENDAR EVENTS

(71) Applicant: Microsoft Technology Licensing, LLC, Redmond, WA (US)

(72) Inventors: Christopher Shingee Park, Issaquah, WA (US); Siddhant Vipul Mehta, Vancouver (CA); Daniel Steven Leclair, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 12 days.

(21) Appl. No.: 16/885,754

(22) Filed: May 28, 2020

(65) Prior Publication Data

US 2021/0374683 A1    Dec. 2, 2021

(51) Int. Cl.
| | |
|---|---|
| G06F 3/0482 | (2013.01) |
| G06Q 10/10 | (2012.01) |
| G01C 21/34 | (2006.01) |

(52) U.S. Cl.
CPC ....... *G06Q 10/1095* (2013.01); *G01C 21/343* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 8,660,790 B2 | 2/2014 | Stahl et al. | |
| 8,849,806 B2 | 9/2014 | Walker et al. | |
| 9,243,911 B2* | 1/2016 | Coughlin | G01C 21/362 |
| 9,247,522 B1 | 1/2016 | Chen et al. | |
| 9,554,356 B2* | 1/2017 | Dotan-Cohen | H04M 1/72454 |
| 9,628,629 B1* | 4/2017 | Kirkpatrick | G06Q 10/1095 |
| 9,804,740 B2 | 10/2017 | Cranfill et al. | |
| 9,973,550 B2 | 5/2018 | Haskins et al. | |
| 2004/0172457 A1* | 9/2004 | Horvitz | H04L 51/26 |
| | | | 709/207 |
| 2013/0096813 A1* | 4/2013 | Geffner | H04W 4/60 |
| | | | 701/117 |

(Continued)

OTHER PUBLICATIONS

"Google Calendar Add-On", Retrieved from: https://support.zoom.us/hc/en-us/articles/360020187492-Google-Calendar-Add-On, Retrieved on Feb. 14, 2020, 5 Pages.

(Continued)

*Primary Examiner* — Linda Huynh

(57) ABSTRACT

In non-limiting examples of the present disclosure, systems, methods and devices for surfacing content related to electronic calendar events are presented. An electronic calendar event library may be maintained. One or more calendar events that meet threshold time criteria in relation to a current time may be identified. One or more rules may be applied to the identified events to determine whether contextual information and/or actions should be surfaced in relation to those events. In some examples, an event priority score may be calculated for each of the identified events. Contextual information and/or actions associated with events with event priority scores that exceed a threshold value may be surfaced. The contextual information and/or actions may be prioritized based on the event priority scores.

20 Claims, 15 Drawing Sheets

(56) References Cited

U.S. PATENT DOCUMENTS

| | | | | |
|---|---|---|---|---|
| 2013/0262173 | A1* | 10/2013 | Chen | G06Q 10/1093 |
| | | | | 705/7.24 |
| 2013/0329527 | A1* | 12/2013 | Alavala | H04W 4/20 |
| | | | | 368/10 |
| 2014/0114571 | A1* | 4/2014 | Coughlin | G01C 21/3438 |
| | | | | 701/526 |
| 2016/0065630 | A1* | 3/2016 | Gupta | G06Q 10/10 |
| | | | | 709/204 |
| 2016/0248865 | A1* | 8/2016 | Dotan-Cohen | H04L 67/26 |
| 2016/0260296 | A1* | 9/2016 | Shirriff | G08B 21/182 |
| 2016/0358065 | A1* | 12/2016 | Gedge | G06N 7/00 |
| 2018/0191652 | A1* | 7/2018 | Goel | H04L 51/16 |
| 2018/0196697 | A1* | 7/2018 | Standefer | G06Q 10/063112 |
| 2019/0014450 | A1* | 1/2019 | Gruber | G06Q 10/109 |
| 2019/0266573 | A1* | 8/2019 | Radhakrishnan | G06Q 10/1095 |

OTHER PUBLICATIONS

Pot, Justin, "Bring Context to Your Calendar by Connecting Other Apps", Retrieved from: https://zapier.com/blog/connect-everything-calendar/, Nov. 25, 2019, 7 Pages.

* cited by examiner

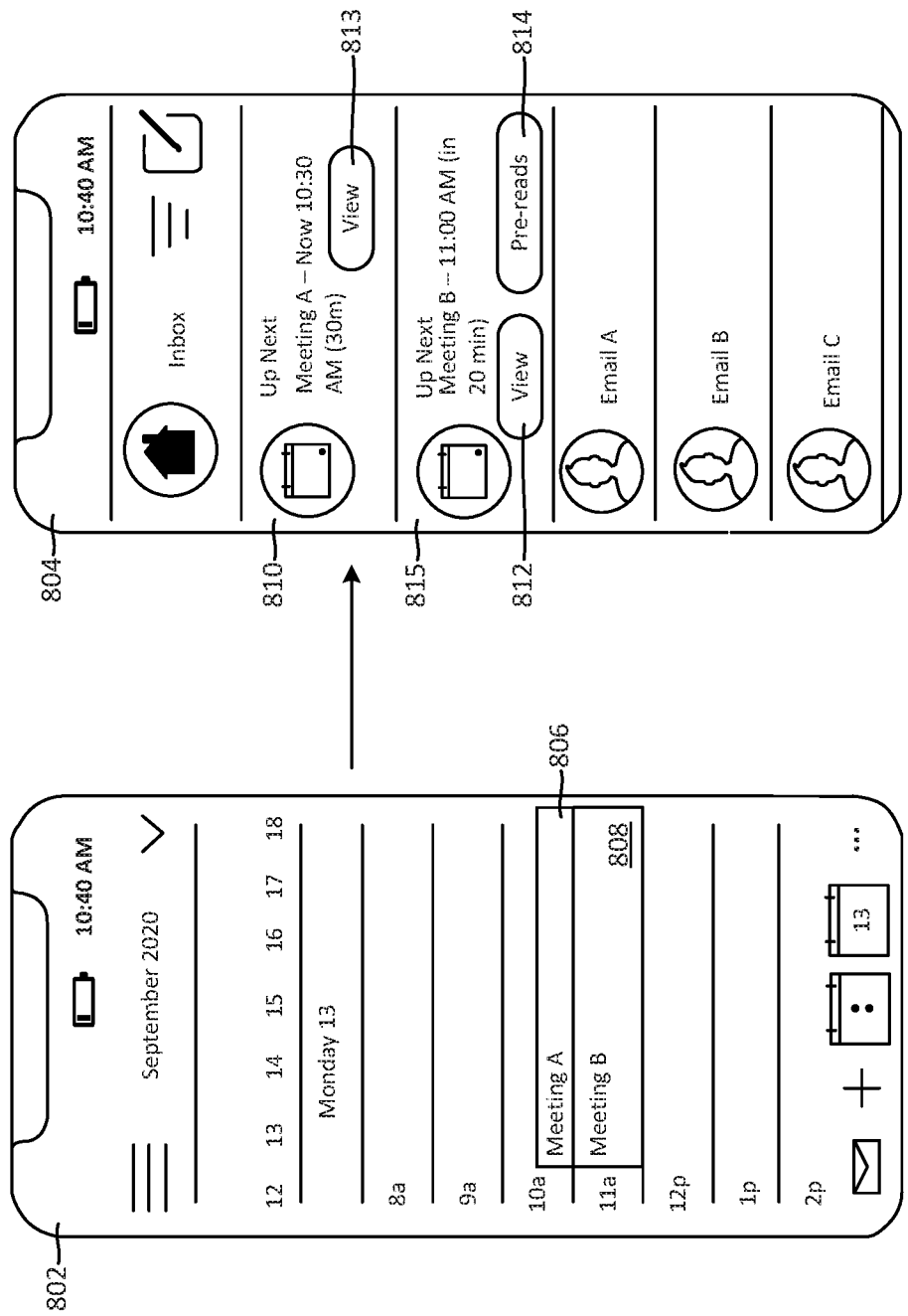

IDENTIFICATION AND SURFACING OF CONTEXTUAL DATA RELATED TO ELECTRONIC CALENDAR EVENTS

BACKGROUND

Electronic calendars and messaging applications that are integrated with those electronic calendars are ubiquitous in business environments and are increasingly being used for the scheduling of personal events. Electronic calendars are often crowded with scheduled events and related information that can be overwhelming and difficult to manage. When electronic calendars are full it can be difficult for busy users to keep track of times that meetings begin and end, where meetings take place, and how to appropriately prepare for those meetings.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying and surfacing contextual content related to electronic calendar events. Electronic calendar events for a user account may be identified and filtered. The electronic calendar events that are filtered may be within a threshold period of time from a current time. For example, one or more electronic calendar events that have already started within a threshold period of time from the current time (e.g., in the last five minutes, in the last ten minutes) may be identified, and one or more electronic calendar events that are going to start within a threshold period of time from the current time (e.g., the next hour, the next two hours) may be identified. One or more rules may be applied to those identified events to filter them. The filtering may be performed to identify electronic calendar events and related contextual information that will be most useful to a user at the current time. In some examples, one or more rules that are applied to filter the electronic calendar events may also be utilized to score and prioritize the electronic calendar events. For example, if a determination is made that contextual information associated with more than one electronic calendar event should be surfaced, the scores for those events and/or the contextual information associated with those events may be utilized to determine in what order to present the contextual information and/or which contextual information to surface most prominently. In some examples, one or more executable actions may be surfaced with contextual information for an electronic calendar event. The executable actions may include map application actions (e.g., surface directions to event location, surface estimated duration of time to travel to event location), online meeting actions (e.g., automatically join online meeting, download application for joining online meeting), and/or surface document actions (e.g., open relevant pre-read document for meeting).

BRIEF DESCRIPTION OF THE DRAWINGS

Non-limiting and non-exhaustive examples are described with reference to the following figures:

FIG. 8 illustrates the identification and surfacing of contextual information related to back-to-back electronic calendar events.

DETAILED DESCRIPTION

Figure 1:
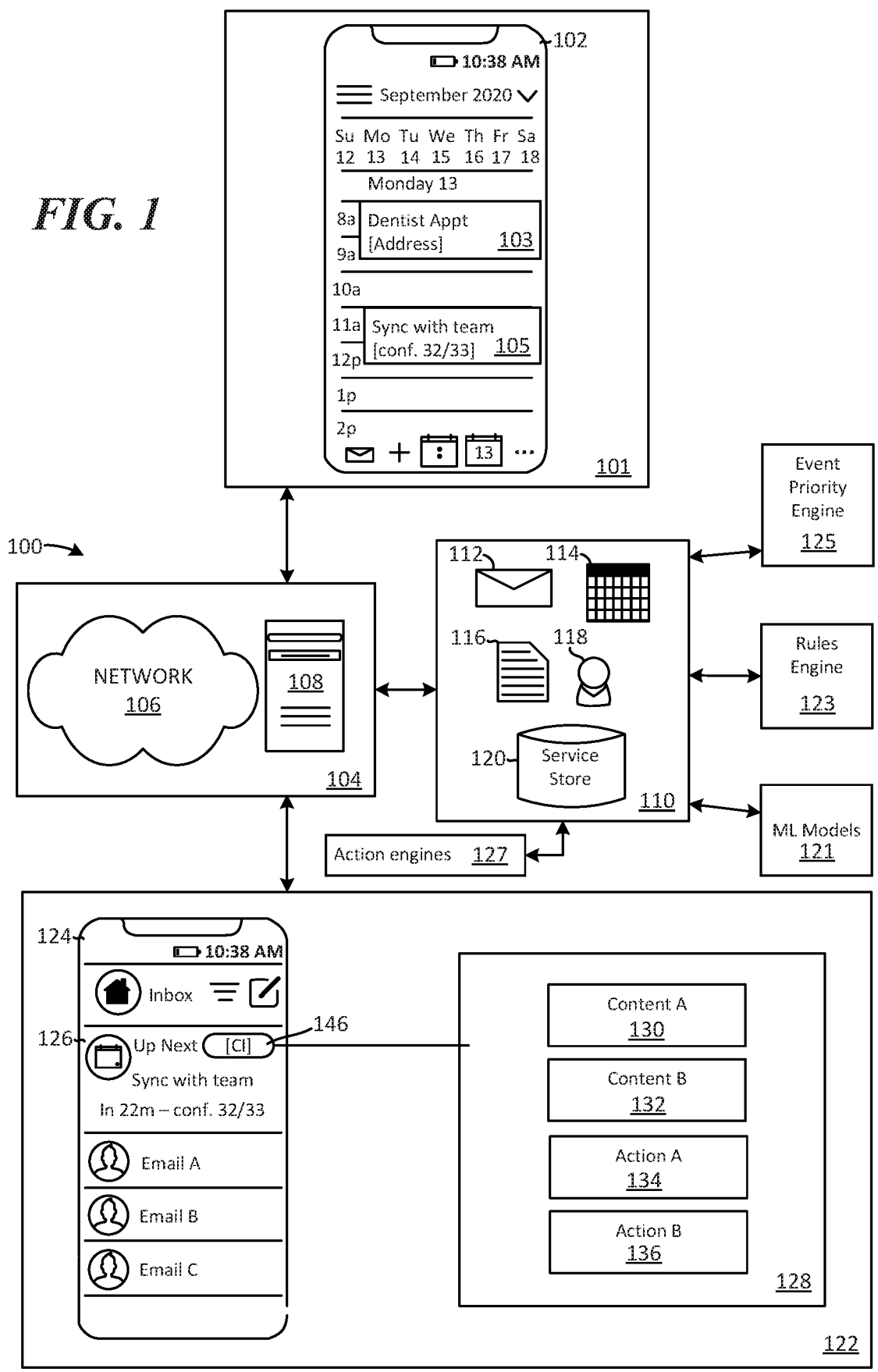
FIG. 1 is a schematic diagram illustrating an example distributed computing environment for identifying and surfacing contextual information related to electronic calendar events.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for identifying and surfacing contextual content related to electronic calendar events. An electronic calendar application service may include calendar information related to a user account. The electronic calendar application service may be maintained on one or more local computing devices (e.g., client computing devices) and/or one or more remote computing devices (e.g., cloud computing devices). The user account may additionally be associated with one or more other productivity applications (e.g., an email application, a word processing application, a presentation application, a group messaging application, etc.). The electronic calendar application service may maintain electronic calendar event information for the user account. For example, the electronic calendar application service may maintain electronic calendar event information for electronic event invitations that have been received by the user account, that have been shared with the user account, and/or that have been sent by the user account. Each electronic calendar event may be associated with one or more of: a start time, an end time, a location, one or more invitees, one or more scheduling users, an agenda, one or more attachments, and/or an online attendance option and/or link.

The electronic calendar application service may determine whether to surface contextual information associated with an electronic calendar event for a user account. Contextual information associated with an electronic calendar event may be surfaced on one or more computing devices and/or one or more software applications associated with a user account that the electronic calendar application service maintains information for. In some examples, the contextual information may be surfaced in an event context window. In additional examples the event context window may include contextual information associated with an electronic calendar event and one or more selectable user interface elements for causing an action associated with an electronic calendar event to be performed. The actions may include providing directions to an electronic calendar event location, joining an online meeting, providing a link to download an application to join an online meeting, and/or the surfacing of one or more documents related to an electronic calendar event. In some examples, the contextual information and/or actions associated with the contextual information may comprise information about one or more invitees/attendees of an electronic calendar event. For example, the electronic calendar application service may surface links to social media accounts (e.g., LinkedIn) of invitees/attendees, and/or information taken directly from social media accounts of invitees/attendees.

The electronic calendar application service may apply one or more rules to determine whether to surface contextual information associated with an electronic calendar event. In some examples, an event priority score may be calculated for an electronic calendar event based on application of one or more rules to the electronic calendar event. The event priority score for an electronic calendar event may determine whether contextual information associated with that electronic calendar event is to be surfaced.

According to some examples, the one or more rules that are applied to an electronic calendar event by the electronic calendar application service may comprise filtering parameters. Those filtering parameters may include: whether an invite for an electronic calendar event has been accepted; whether an electronic calendar event is on a calendar for a user account (e.g., is not just shared with the user account); whether an electronic calendar event has been canceled; whether an electronic calendar event is an all-day event; whether an electronic calendar event starts within a threshold period of time (e.g., next two hours, next three hours) and whether an estimated duration of time needed to travel from a user's current location to the electronic calendar event location exceeds the time remaining until the electronic calendar event begins; whether an electronic calendar event started within a threshold period of time (e.g., the last five minutes, the last ten minutes); and whether an electronic calendar event starts within a threshold period of time (e.g., the next thirty minutes, the next forty-five minutes).

In some examples, contextual information associated with an electronic calendar event may only be surfaced if the user account associated with the surfacing (e.g., the invitee/attendee) is designated as being busy during the time corresponding to that electronic calendar event. For example, contextual information associated with an electronic calendar event may only be surfaced if a user has accepted an electronic calendar invitation for an electronic calendar event, rather than replying "tentative" or not accepting the invite at all. In some examples, if contextual information and/or executable actions associated with an electronic calendar event are surfaced, that information may be manually dismissed (e.g., a user may swipe the notification away, the user may close out an event context window that includes that information), which may cause that information to be filtered out from being displayed in the future. In some examples, that information may be resurfaced if an application where the information was surfaced is restarted (e.g., the contextual information may not be saved persistently). In some examples, if contextual information and/or executable actions associated with an electronic calendar event are dismissed, contextual information and/or executable actions associated with a different electronic calendar event that has a next highest event priority score may be surfaced.

According to some examples, if event priority scores for a plurality of electronic calendar events exceed a surfacing threshold value, the electronic calendar application service may prioritize contextual information for events that have earlier start times, events that have attendees, and/or events that are associated with locations. In some examples, prioritizing contextual information related to electronic calendar events may comprise one or more of: displaying a higher priority event above a lower priority event, displaying a higher priority event in a more prominent manner (e.g., bold border, highlighted, etc.) than a lower priority event, and/or surfacing a higher priority event in more or different locations (e.g., additional application surfaces, as a pop-up notification, etc.).

The systems, methods, and devices described herein provide technical advantages for surfacing contextual information related to electronic calendar events. The mechanisms described herein for surfacing contextual information and executable actions related to electronic calendar events reduce the number of operations that are taken on computing devices related to users searching for information associated with current and upcoming calendar events. The systems, methods and devices described herein reduce the number of times that calendar applications are opened, reduce the number of searches performed in those calendar applications, reduce the number of searches performed in file directories and email services to identify relevant pre-read documents, and reduce location searches in map applications, among other efficiencies. As such, processing costs (e.g., CPU cycles) needed to manage schedules and electronic calendar events are reduced via the systems, methods and devices described herein. The user experience associated with managing busy schedules and workloads is also improved upon by automatically surfacing contextual information and time saving executable actions that are relevant to electronic calendar events that have just begun or that will be beginning soon.

FIG. 1 is a schematic diagram illustrating an example distributed computing environment 100 for identifying and surfacing contextual information related to electronic calendar events. Computing environment 100 includes electronic calendar event sub-environment 101, network and processing sub-environment 104, service store sub-environment 110, machine learning models 121, rules engine 123, event priority engine 125, action engines 127, and contextual information surfacing sub-environment 122.

Network and processing sub-environment 104 includes network 106, by which any of the computing devices described herein may communicate with one another, and server computing device 108, which is exemplary of a cloud-computing device that may perform one or more operations described herein in relation to a cloud-based application service (e.g., an electronic calendar application service, an email application service, a document application service, etc.). Although an electronic calendar application service is primarily described herein as being a cloud-based service, one or more processing operations associated with that service may be performed locally (e.g., on computing device 102, on computing device 124).

Service store sub-environment 110 comprises service store 120, which contains information associated with a plurality of users' electronic calendar/scheduling applications, including documents 116, user information 118, past, present, and future calendar events 114, and meeting/event invitations 112 associated with past, present and future events. Documents 116 may include productivity application documents that are stored locally to a local computing device such as computing device 102 and/or one or more remote storage locations. Documents 116 may comprise one or more documents of one or more document types, including one or more of: emails, saved instant messages, word processing documents, presentation documents, spreadsheet documents, note application documents, etc. Server computing device 108 and an associated electronic calendar application service may communicate with service store 120 and obtain and analyze information included therein in performing one or more operations described herein.

Machine learning models 121 may be incorporated in the electronic calendar application service and/or one or more other services (e.g., a digital assistant service, an email service). Machine learning models 121 may comprise one or more language processing models which may be applied to one or more documents included in service store 120 and/or to one or more electronic calendar events and/or electronic calendar event invitations. Machine learning models 121 may comprise one or more word, string and/or document embedding models, one or more nearest neighbor models, and/or one or more neural networks that have been trained to classify language. Additional details regarding machine learning models are provided below in relation to FIG. 5 and FIG. 6.

In this example, computing device 102 displays an electronic calendar application. The displayed electronic calendar application may be associated with one or more user accounts in service store 120 and/or the electronic calendar application service. The displayed user interface for the electronic calendar application shows all currently scheduled events for Monday Sep. 13, 2020 for the one or more users associated with that electronic calendar application. Specifically, first calendar event 103 ("Dentist Appt") and second calendar event 105 ("Sync with team") are included on the electronic calendar for a user account associated with computing device 102. First calendar event 103 is scheduled from 8 am to 9:30 am, and second calendar event 105 is scheduled from 11 am to 12:30 pm. First calendar event 103 has an address associated with it (e.g., a geographic location for the dentist appointment), and second calendar event 105 has a building and conference room associated with it (conf. 32/33—a geographic location for the team meeting).

Contextual information surfacing sub-environment 122 includes computing device 124 and contextual information 128. Computing device 124 may be the same computing device as computing device 102 or a different computing device as computing device 124. Computing device 124 displays an email application. The email application is associated with the same user account as the user account associated with the electronic calendar application displayed by computing device 102. Computing device 124 displays the email application at 10:38 AM on Monday Sep. 13, 2020.

The electronic calendar application service or the email application service may perform one or more operations to determine whether to cause contextual information associated with electronic calendar events (e.g., first calendar event 103, second calendar event 105) to be surfaced in the email application user interface (or a different user interface surface—e.g., as a notification, as a widget, etc.) on computing device 124. For example, the electronic calendar application service may analyze electronic calendar events for a user account that begin within a threshold period of time from the current time (e.g., the entire current day, the next one hour, the next two hours, the next five hours, etc.) and/or that began a threshold period of time from the current time (e.g., the past five minutes, the past ten minutes). The electronic calendar application service may determine whether contextual information associated with one or more of those electronic calendar events should be surfaced based on one or more rules engines, such as rules engine 123, and/or one or more event priority engines, such as event priority engine 125. One or more of rules engine 123 and/or event priority engine 125 may be stored and/or executed in the cloud (e.g., by a server such as server computing device 108) and/or by a local computing device, such as computing device 102 and/or computing device 124.

Rules engine 123 may include one or more filtering parameters. The filtering parameters may dictate whether contextual information associated with an electronic calendar event is to be surfaced. For example, the parameters may include a rule that contextual information associated with an electronic calendar event will only be surfaced on a device associated with a user account if: the electronic calendar event has been accepted by the user account; the electronic calendar event is on the user account's calendar (e.g., has not been shared with that user account); the electronic calendar event has not been canceled; the electronic calendar event is not an all-day meeting; and at least one of the following two parameters is met: (1) the electronic calendar event starts within a threshold period of time from the current time (e.g., the next hour, the next two hours) and the estimated travel time exceeds the time remaining until the electronic calendar event starts; or (2) the electronic calendar event started within a threshold period of time (e.g., the last five minutes, the last ten minutes) or starts within the next thirty minutes.

Event priority engine 125 may include one or more sorting parameters. For example, the electronic calendar application service may surface contextual information for electronic calendar events based on calculating surfacing scores for one or more calendar events and/or one or more pieces of contextual information associated with those one or more calendar events. In some examples, the surfacing scores may be event priority scores. In some examples, only calendar events and/or contextual information associated with those one or more events for which a surfacing score exceeds a threshold value may be caused to be surfaced by the electronic calendar application service. In some examples, a higher surfacing score may be calculated/assigned to electronic calendar events that are closer to a current time than for electronic calendar events that are further from the current time. In additional examples, a higher surfacing score may be calculated/assigned to electronic calendar events that include attendees than for electronic calendar events that do not include attendees. In still additional examples, a higher surfacing score may be calculated/assigned to electronic calendar events that include a location than for electronic calendar events that do not include a location.

Action engines 127 may include one or more engines for determining which content and/or selectable action elements are to be surfaced for electronic calendar events. Action engines 127 may reside and/or be executed in the cloud (e.g., server computing device 108) and/or by local computing devices (e.g., computing device 102, computing device 124). Some specific examples of rules associated with action engines 127 may include: a first rule that dictates that electronic calendar events that start within a threshold duration of time (e.g., the next ten minutes, the next fifteen minutes) and have an online meeting set will cause a "join meeting" action element to be surfaced or a selectable element for downloading an electronic meeting application/add-in to be surfaced, depending on whether the user has a required meeting provider application/add-in installed on her device; a second rule that dictates that a "directions" action element is surfaced if a user is running late to an electronic calendar event; a third rule that dictates that a "directions" action element is surfaced if the electronic calendar application service cannot determine the user's location; a fourth rule that dictates that if an electronic calendar event has an online meeting set, a "join meeting" action element will be surfaced or a selectable element for downloading an electronic meeting application/add-in will be surfaced, depending on whether the user has a required meeting provider application/add-in installed on her device; and a fifth rule that dictates that if criteria for none of the first four rules apply, then surface a selectable "view" element, which when selected may cause details for the corresponding electronic calendar event to be surfaced. Additional engines and operations that may be associated with action engines 127 are described below.

In some examples, a "directions" action element that is selectable for surfacing directions from a user's current location to a location associated with an electronic calendar event may be surfaced regardless of the distance between the user's current location and the location associated with the electronic calendar event. In other examples, a "directions" action element may not be surfaced if the distance between a user's current location and a location associated with an electronic calendar event is over a threshold distance or under a threshold distance. In examples where a "directions" action element is not surfaced, a selectable element to join the electronic calendar event online may be surfaced.

A geographic location/directions engine may determine a geographic location associated with an electronic calendar event, and a geographic location of a computing device associated with a user account that contextual information may be surfaced on. For example, the electronic calendar application service may determine geocoordinates for the dentist office corresponding to first calendar event 103, and geocoordinates for the current location of computing device 124. In some examples, the electronic calendar application may determine a geographic location associated with an electronic calendar application service by analyzing the electronic event itself. For example, an electronic event may include or be associated with an address for a corresponding event. In additional examples, the electronic calendar application service may utilize information from an electronic calendar event and automatically perform a search to determine a location for the electronic calendar event. For example, if there is no location included (e.g., location metadata associated with event object, location property associated with event object) in first calendar event 103, but there is a name of a dentist included in first calendar event 103, the electronic calendar application service may perform an internet or database search using that information to identify geocoordinates for the event. In some examples, the electronic calendar application service may query a map and/or directions service to determine a route and/or a duration of time that it will take a user to travel from a current location (e.g., the current location of computing device 124) to a location corresponding to an electronic calendar event. In some examples, a surfacing score may be calculated by the geographic location/directions engine. The score may correspond to the time that an event is scheduled to begin and a duration of time that it calculated for a user to travel from her current location to the event. The score may be higher as the duration of travel time approaches the event time and lower the further out in time the event is. For example, if it is determined that it will take a user one hour to travel to an event location and the time is one hour from the start of the event, the surfacing score may be highest. Alternatively, if it is determined that it will take a user one hour to travel to an event location and the time is three hours from the start of the event, the surfacing score may be lower.

A conference room directions engine may perform one or more operations associated with determining whether there is conference room associated with an electronic calendar event. The determination may be made based on the electronic calendar event itself. For example, a conference room may be included as a property of electronic calendar event object or as metadata associated with an electronic calendar event. In other examples, the electronic calendar event service may analyze one or more documents associated with an electronic calendar event (e.g., electronic event invitation, electronic event agenda) and determine whether they include a conference room location for the electronic calendar event. If a determination is made that there is a conference room location associated with an electronic calendar event, the electronic calendar application service may cause directions to that conference room to be surfaced as contextual information on a computing device, such as computing device 124. In some examples, directions to a conference room may only be surfaced if a user is determined to never have been to the conference room before or if a user is determined to have been to the conference room less than a threshold number of times. In still other examples, directions to a conference room may only be surfaced if the conference room is determined to be in a building that is not a building corresponding to a user's primary location (e.g., a primary location included in a profile for the user in service store 120).

A document pre-read engine may perform one or more operations associated with identifying relevant documents (or links to documents) to surface as contextual information in relation to upcoming or in progress electronic calendar events. Additional details related to the document pre-read engine are provided below in relation to FIG. 5 and FIG. 6.

In this example, at 10:38 AM the user associated with computing device 124 opens the email application displayed on computing device 124. The electronic calendar application service causes event context window 126 associated with second calendar event 105 to be surfaced because that is the only upcoming event for the day (or for a threshold period of time from the current time). Contextual information 125 includes the description "Up Next" and, the title of the electronic calendar event "Sync with team", the location "conf. 32/33" and an indication of how long before the electronic calendar event begins "In 22 m". Event context window 126 also includes selectable user interface element 146, which if selected, may cause additional contextual information and/or one or more actions to be performed as illustrated by contextual information 128.

Contextual information 128 includes content A 130, content B 132, Action A 134 and Action B 136. Content A 130 and Content B 132 are illustrative of contextual content related to second calendar event 105 that may be surfaced upon selection of selectable user interface element 146. In some examples, the contextual content related to second calendar event 105 may include one or more pre-reads that have been identified as being relevant to second calendar event 105. Action A 134 and Action B 136 are illustrative of actions that may be caused to be executed by a corresponding selection of selectable user interface element 146. For example, selectable user interface element 146 may comprise a "directions" action element, a "join meeting" action element, and/or a "email organizer" action element (e.g., to email the organizer of an electronic calendar event if there is no location or online meeting option associated with the electronic calendar event).

Figure 2A:
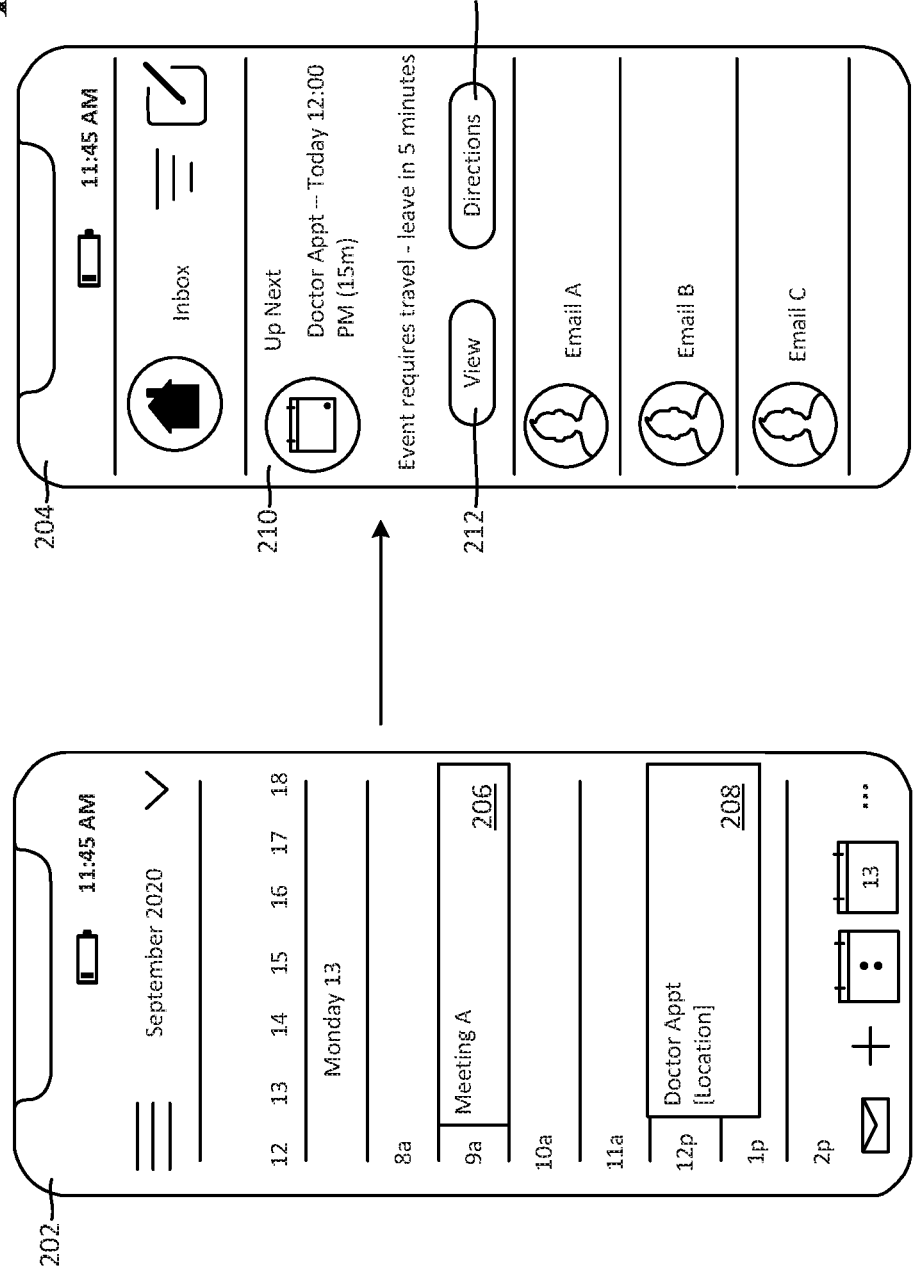
FIG. 2A illustrates the identification and surfacing of contextual information related to an electronic calendar event, including a travel recommendation based on location information.

FIG. 2A illustrates the identification and surfacing of contextual information related to an electronic calendar event, including a travel recommendation based on location information. FIG. 2A includes computing device 202 and computing device 204. Computing device 202 and computing device 204 may be the same or different computing devices. Computing device 202 and computing device 204 are each associated with a same specific user account. Computing device 202 displays an electronic calendar application associated with an electronic calendar application service and the specific user account. Computing device 204 displays an email application that is also associated with the specific user account.

The electronic calendar application on computing device 202 displays electronic calendar events for the user account on Monday Sep. 13, 2020. The electronic calendar events for the user of that account include first calendar event 206 ("Meeting A"), which is a one hour meeting starting at 9:00 AM, and second calendar event 208 ("Doctor Appt"), which is an hour and a half meeting starting at 12:00 PM. Second calendar event 208 is associated with a location ("[Location]").

Computing device 204 displays the email application at 11:45 AM on September 13. As such, the electronic calendar application service determines (e.g., via application of a rules engine, via application of an event priority engine, via application of one or more machine learning models, via application of one or more action engines) whether contextual information associated with one or more electronic calendar events should be surfaced in the email application user interface. For example, the electronic calendar application service may determine that second calendar event 208 is within a threshold period of time of the current time (e.g., within two hours), that second calendar event 208 has been accepted, that second calendar event 208 has not been cancelled, and that second calendar event 208 is not an all-day meeting. In some examples, the electronic calendar application service may only surface contextual information associated with a calendar event if all of those criteria are met and an estimated travel time to the location corresponding to the calendar event exceeds the time remaining until the event starts, the electronic calendar event started within a threshold period of time (e.g., last five minutes, last ten minutes), or the electronic calendar event starts within a threshold period of time (e.g., next thirty minutes, next forty-five minutes).

In this example, the electronic calendar application service determines that second calendar event 208 meets surfacing parameters. For example, based on application of one or more rules and/or filtering criteria described above, the electronic calendar application may have calculated an event priority score for second calendar event 208 and determined that the event priority score is above a surfacing threshold value. As such, the electronic calendar application service causes event context window 210 to be displayed by computing device 204. In this example, event context window 210 is displayed in the email application above the most current email. However, event context window 210 may be displayed in a different application, as a widget, and/or as part of an operating system shell surface. Event context window 210 includes the description "Up Next", the title of second electronic calendar event 208 ("Doctor Appt"), an indication of how long before the second calendar event 208 beings (15 m), the time that second calendar event 208 begins (12:00 PM), an indication that second calendar event 208 is going to require travel to attend ("Event requires travel"), and a suggested time for leaving the user's current location (e.g., the current location of computing device 204) for second calendar event 208 ("leave in 5 minutes").

Event context window 210 also includes first selectable user interface element 212 and second selectable user interface element 214. Selection of first selectable user interface element 212 may cause additional information related to second calendar event 208 to be surfaced (e.g., the calendar event itself may be surfaced in the electronic calendar application, the calendar event itself may be surfaced in event context window 210, documents that have been identified as being relevant to second calendar event 208 may be surfaced, etc.). Selection of second selectable user interface element 214 may cause a map application to open on computing device 204 with directions automatically populated for getting to the location corresponding to second calendar event 208. In other examples, selection of second selectable user interface element 214 may cause the directions to be surfaced in event context window 210. In still additional examples, if the user account associated with computing device 204 and the email application has a determined history of utilizing a transportation service (e.g., ride share service, subway system) selection of second selectable user interface element 214 may cause an application associated with that service to automatically be opened and/or populate the application associated with that service with relevant details for travelling to the location associated with second calendar event 208.

Figure 2B:
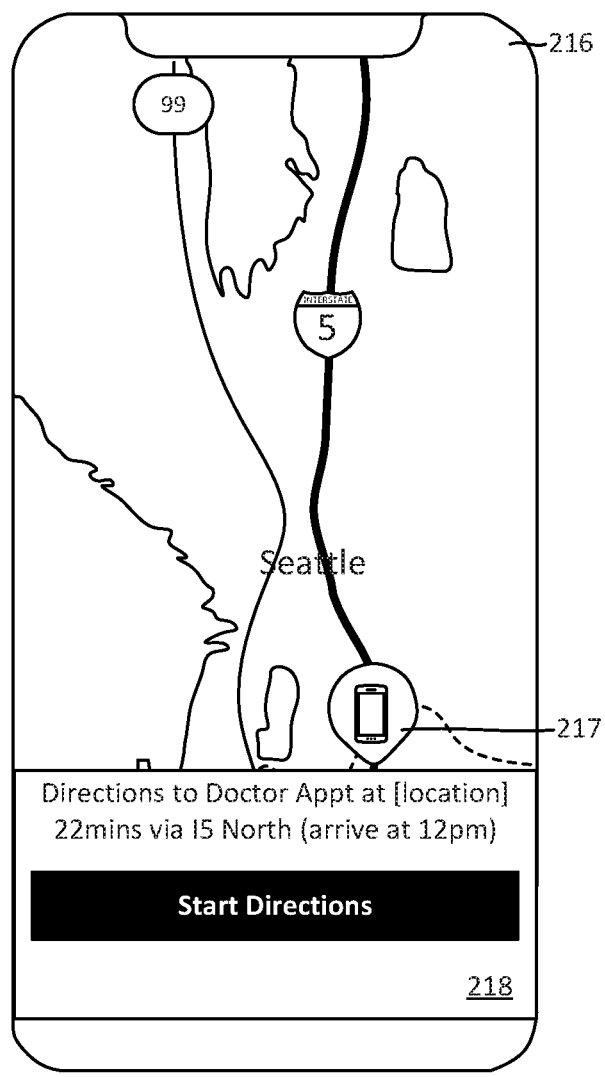
FIG. 2B illustrates the result of interaction with a selectable user interface element included in contextual information surfaced in relation to an electronic calendar event.

FIG. 2B illustrates the result of interaction with a selectable user interface element included in contextual information surfaced in relation to an electronic calendar event. Specifically, FIG. 2B illustrates one possible result of interaction with the second selectable user interface element 214

("directions") in FIG. 2A. Computing device 216 is the same computing device as computing device 204 in FIG. 2A. Thus, selection of second selectable user interface element 214 may cause a map application to be opened with directions to the location corresponding to second calendar event 208 being automatically populated in that map application as the end point, and location information corresponding to the user's current location (e.g., the current location of computing device 216) to be automatically populated as the start location in the map application. Thus, computing device 216 displays a map application with computing device's 216 current location 217 displayed, as well as the route to the location corresponding to second calendar event 208 displayed in the map application. The map application also displays window 218, which includes the text "Directions to Doctor Appt at [location] 22 mins via I5 North (arrive at 12 pm)" and a selectable option to start the directions in the map application.

Figure 3:
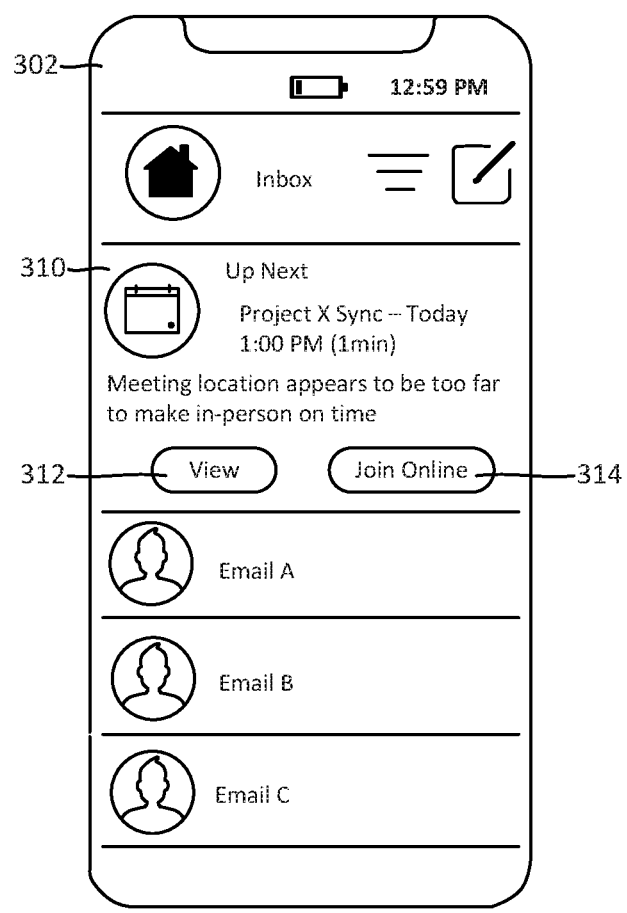
FIG. 3 illustrates the identification and surfacing of contextual information related to an electronic calendar event, including a recommendation to attend the electronic calendar event via a remote connection.

FIG. 3 illustrates the identification and surfacing of contextual information related to an electronic calendar event, including a recommendation to attend the electronic calendar event via a remote connection. FIG. 3 includes computing device 302. Computing device 302 displays an email application. The email application and computing device 302 are associated with a specific user account. The user account is also associated with the electronic calendar application service.

Computing device 302 displays the email application at 12:59 PM. The electronic calendar application determines (e.g., via application of a rules engine, via application of an event priority engine, via application of one or more machine learning models, via application of one or more action engines) whether contextual information associated with one or more electronic calendar events should be surfaced. For example, the electronic calendar application service may determine whether any electronic calendar events for the current day (or within a threshold period of time) are within a threshold period of time of the current time (e.g., within two hours, within three hours), whether any of those electronic calendar events have been accepted, have not been cancelled, and are not all-day meetings. In additional examples, the electronic calendar application service may only surface contextual information associated with a calendar event if all of those criteria are met and an estimated travel time to the location corresponding to the calendar event exceeds the time remaining until the event starts, the electronic calendar event started within a threshold period of time (e.g., last five minutes, last ten minutes), or the electronic calendar event starts within a threshold period of time (e.g., next thirty minutes, next forty-five minutes).

In this example, the electronic calendar application service determines that an electronic calendar event for "Project X Sync" that begins at 1:00 PM meets the surfacing parameters. For example, based on application of one or more rules and/or filtering criteria described above, the electronic calendar application may have calculated an event priority score for an event corresponding to "Project X Sync" and determined that the event priority score is above a surfacing threshold value. As such, the electronic calendar application service causes event context window 310 to be displayed by computing device 302. In this example, event context window 310 is displayed in the email application above the most current email. However, event context window 310 may be displayed in another application, as a widget, and/or as part of an operating system shell surface. Event context window 310 includes the description "Up Next", the title of the electronic calendar event ("Project X sync"), an indication of the time and day that the electronic calendar event is to begin ("Today 1:00 PM"), an indication of how long before the electronic calendar event is to begin (1 min), and an indication that a location of the electronic calendar event is too far away for the user to make it to on time ("Meeting location appears to be too far to make in-person on time").

Event context window 310 also includes first selectable user interface element 312 ("View") and second selectable user interface element 314 ("Join Online"). Selection of first selectable user interface element 312 may cause additional information related to the electronic calendar event to be surfaced (e.g., the calendar event itself may be surfaced in the electronic calendar application, the calendar event itself may be surfaced in event context window 310, documents that have been identified as being relevant to the electronic calendar event may be surfaced, etc.). Selection of second selectable user interface element 314 may cause computing device 302 to automatically connect to an electronic communication service and join the electronic calendar event remotely via that electronic communication service.

Figure 4:
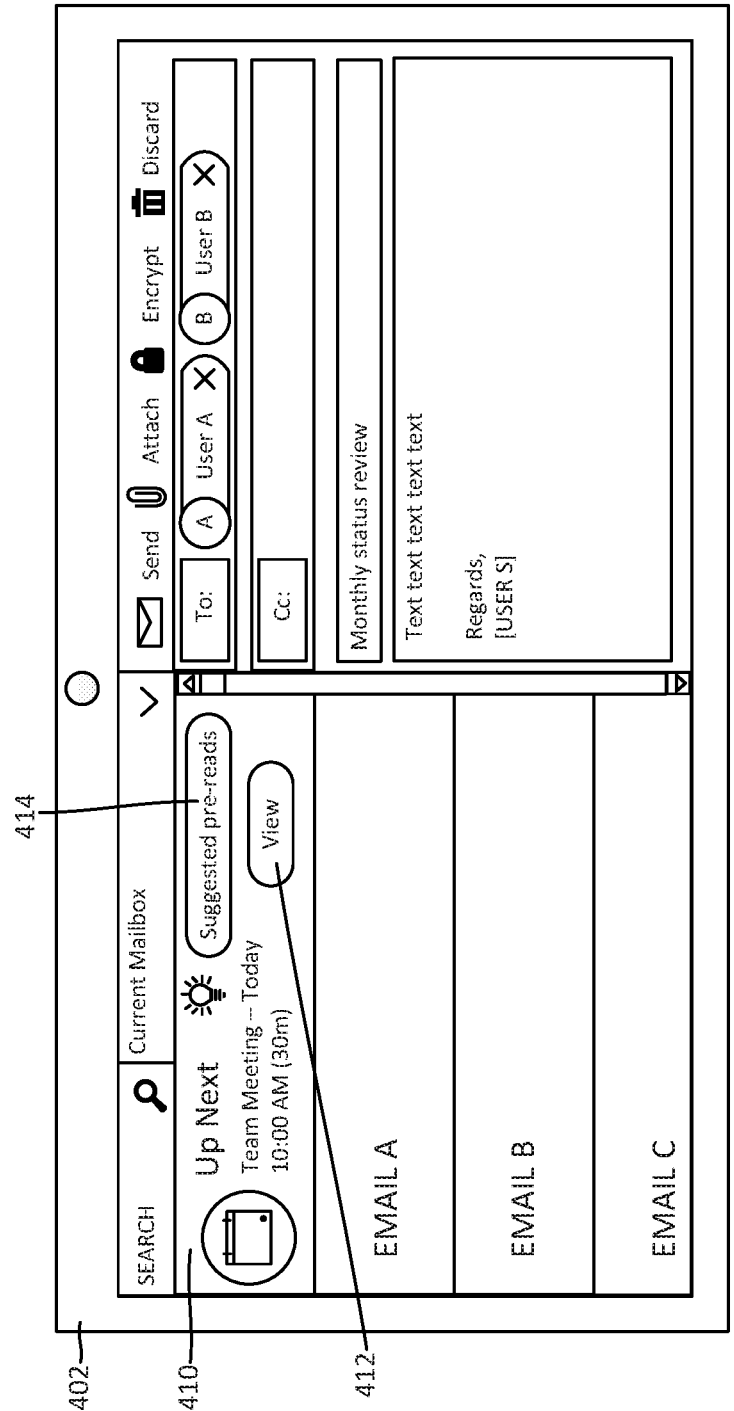
FIG. 4 illustrates the identification and surfacing of contextual information related to an electronic calendar event, including documents that are suggested pre-reads for attending the electronic calendar event.

FIG. 4 illustrates the identification and surfacing of contextual information related to an electronic calendar event, including documents that are suggested pre-reads prior to attending the electronic calendar event. FIG. 4 includes computing device 402. Computing device 402 displays an email application. The email application and computing device 402 are associated with a specific user account. The user account is also associated with the electronic calendar application service.

The electronic calendar application determines (e.g., via application of a rules engine, via application of an event priority engine, via application of one or more machine learning models, via application of one or more action engines) whether contextual information associated with one or more electronic calendar events should be surfaced. For example, the electronic calendar application may determine whether any electronic calendar events begin within a threshold period of time of the current time (e.g., within two hours, within three hours) or have begun within a threshold period of time of the current time (e.g., within the last five minutes, within the last ten minutes), whether any of those electronic calendar events have been accepted, have not been cancelled, and are not all-day meetings. In additional examples, the electronic calendar application service may only surface contextual information associated with a calendar event if all of those criteria are met and an estimated travel time to the location corresponding to the calendar event exceeds the time remaining until the event starts, the electronic calendar event started within a threshold period of time (e.g., last five minutes, last ten minutes), or the electronic calendar event starts within a threshold period of time (e.g., next thirty minutes, next forty-five minutes).

In this example, the electronic calendar application service determines that an electronic calendar event for "Team Meeting" that begins at 10:00 AM meets the surfacing parameters. For example, based on application of one or more rules and/or filtering criteria described above, the electronic calendar application may have calculated an event priority score for an event corresponding to "Team Meeting" and determined that the event priority score is above a surfacing threshold value. As such, the electronic calendar application service causes event context window 410 to be displayed by computing device 402. In this example, event context window 410 is displayed in the email application above the most current email. However, event context window 410 may be displayed in another application, as a widget, and/or as part of an operating system shell surface. Event context window 410 includes the description "Up Next", the title of the electronic calendar event ("Team Meeting"), an indication of the time and day that the electronic calendar event is to begin ("Today at 10:00 AM"), an indication of how long before the electronic calendar event is to begin (30 m).

Event context window 410 also includes a first selectable user interface element 412 ("View") and a selectable user interface element 314 ("Suggested pre-reads"). Selection of first selectable user interface element 412 may cause additional information related to the electronic calendar event to be surfaced (e.g., the calendar event itself may be surfaced in the electronic calendar application, the calendar event itself may be surfaced in event context window 410). Selection of second selectable user interface element 414 may cause computing device 402 to open and/or display selectable elements for opening one or more documents that have been identified as being relevant to the electronic calendar event as more fully described below in relation to FIG. 5 and FIG. 6.

Figure 5:
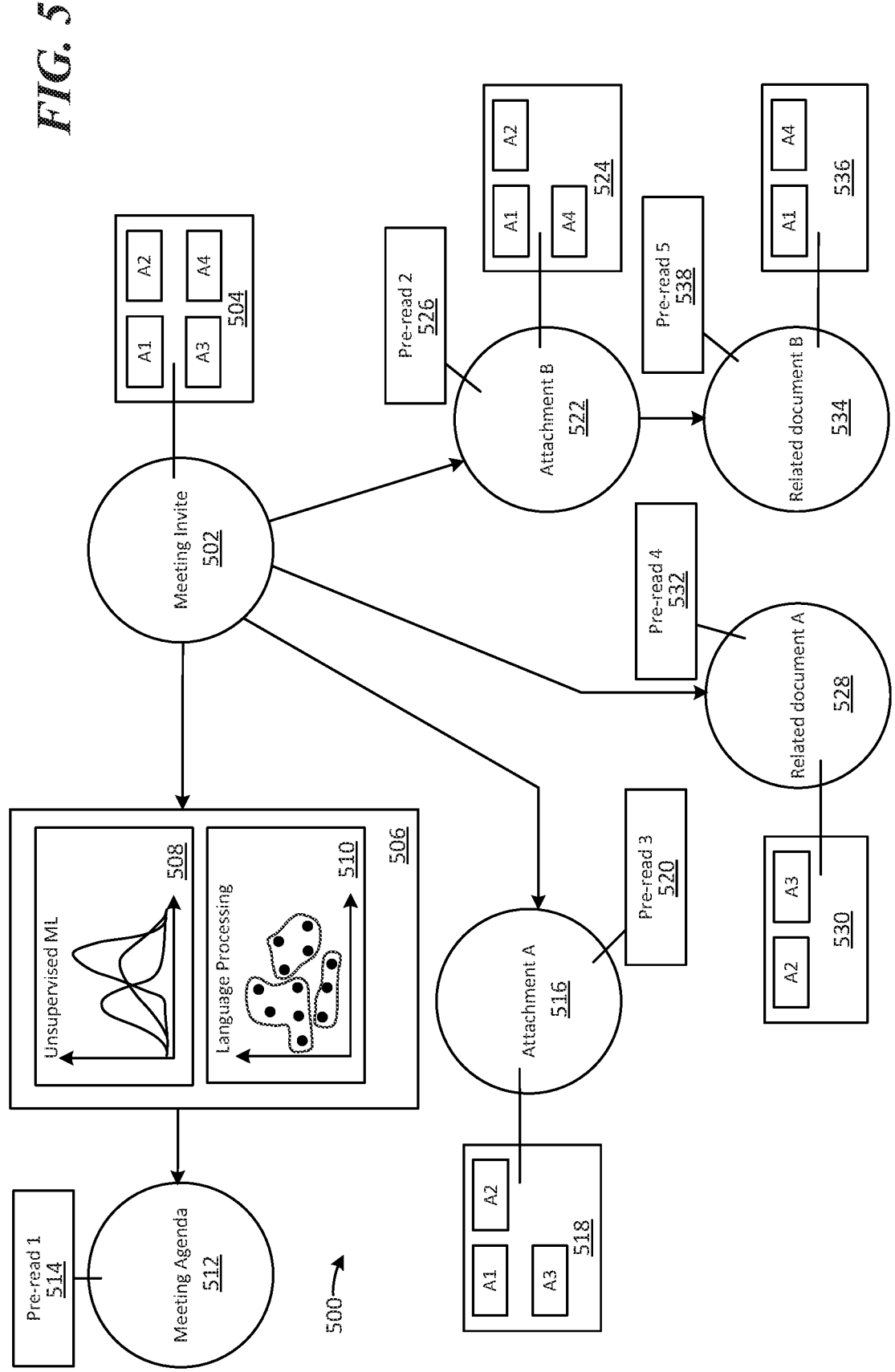
FIG. 5 illustrates a computing environment for node processing in a graphical matrix for identifying and recommending meeting pre-reads.

FIG. 5 illustrates a computing environment 500 for node processing in a graphical matrix for identifying and recommending meeting pre-reads. Computing environment 500 depicts a portion of a graphical matrix comprising a plurality of resources (e.g., application documents, emails, saved instant message conversations, notes, etc.), which digitally connects resources to one another based on one or more attributes of those resources. Computing environment 500 also depicts the processing of one or more resources (in this case the original meeting invite 502) to determine whether a meeting agenda has been associated with an electronic meeting invite. In some examples, values for each of a plurality of resources in the graphical matrix may be calculated as relating to original meeting invite 502 and/or one or more other resources in the graph (e.g., an electronic meeting event object), and a determination may be made based on those values as to whether to include those resources as suggested pre-reads associated with an event context window. The calculated values may comprise pre-read scores. In some examples, a pre-read with a highest pre-read score may be surfaced as a suggested pre-read.

Computing environment 500 and the depicted graphical matrix includes meeting invite resource 502 with corresponding attributes (A1, A2, A3, A4) 504; meeting agenda resource 512, which is illustrated as being a suggested pre-read in relation to pre-read 1 element 514; natural language processing and machine learning element 506; attachment A resource 516 with corresponding attributes (A1, A2, A3) 518, which is illustrated as being a suggested pre-read in relation to pre-read 3 element 520; attachment B resource 522 with corresponding attributes (A1, A2, A4) 524, which is illustrated as being a suggested pre-read in relation to pre-read 2 element 526; related document A resource 528 with corresponding attributes (A2, A3) 530, which is illustrated as being a suggested pre-read in relation to pre-read 4 element 532; and related document B resource 534 with corresponding attributes (A1, A4) 536, which is illustrated as being a suggested pre-read in relation to pre-read 5 element 538.

According to examples, attributes may be associated with each of the resources in the graphical matrix. The attributes may correspond to: time of creation and/or last edit; type of resource; resource attachments (i.e., what other resources is a resource attached to); actual content; creators; modifiers; interaction history; and importance, for example.

For example, attribute A1 may correspond to a time and/or date of resource creation and/or last edit, attribute A2 may correspond to a type of resource (e.g., word processing document, email document, presentation document, spreadsheet document, notes document, etc.), attribute A3 may correspond to a content type and/or classification of resource (e.g., relates to topic A, relates to topic B), and attribute A4 may correspond to whether a resource is directly attached to an electronic meeting invite. A determination may thus be made based on attribute overlap amongst resources and/or based on the level of connectedness (e.g., first level from meeting invite resource 502, second level removed from meeting invite resource 502, etc.) as to whether to include a resource as a suggested pre-read in an event context window. A pre-read score may be calculated based on the attribute overlap amongst resources and/or based on the level of connectedness.

According to examples, one or more resources that have been determined to relate to a meeting invite and/or an electronic calendar event may be further processed to determine whether they correspond to a meeting agenda. In this example, the original meeting invite 502 (i.e., the content included in the meeting invite) is processed by one or more machine learning models and/or natural language processing models as illustrated by natural language processing and machine learning element 506 to determine whether a meeting agenda is included in that invite. For example, language clustering models may be applied to text in a resource to determine whether a resource exceeds a threshold value for corresponding to a meeting agenda. In another example, a neural network may be applied to a resource, or portions thereof, to determine whether it should be classified as a meeting agenda. Once classified as a meeting agenda, a resource may be associated with an electronic calendar event in an electronic calendar application as a suggested pre-read that can be surfaced in an event context window.

Figure 6:
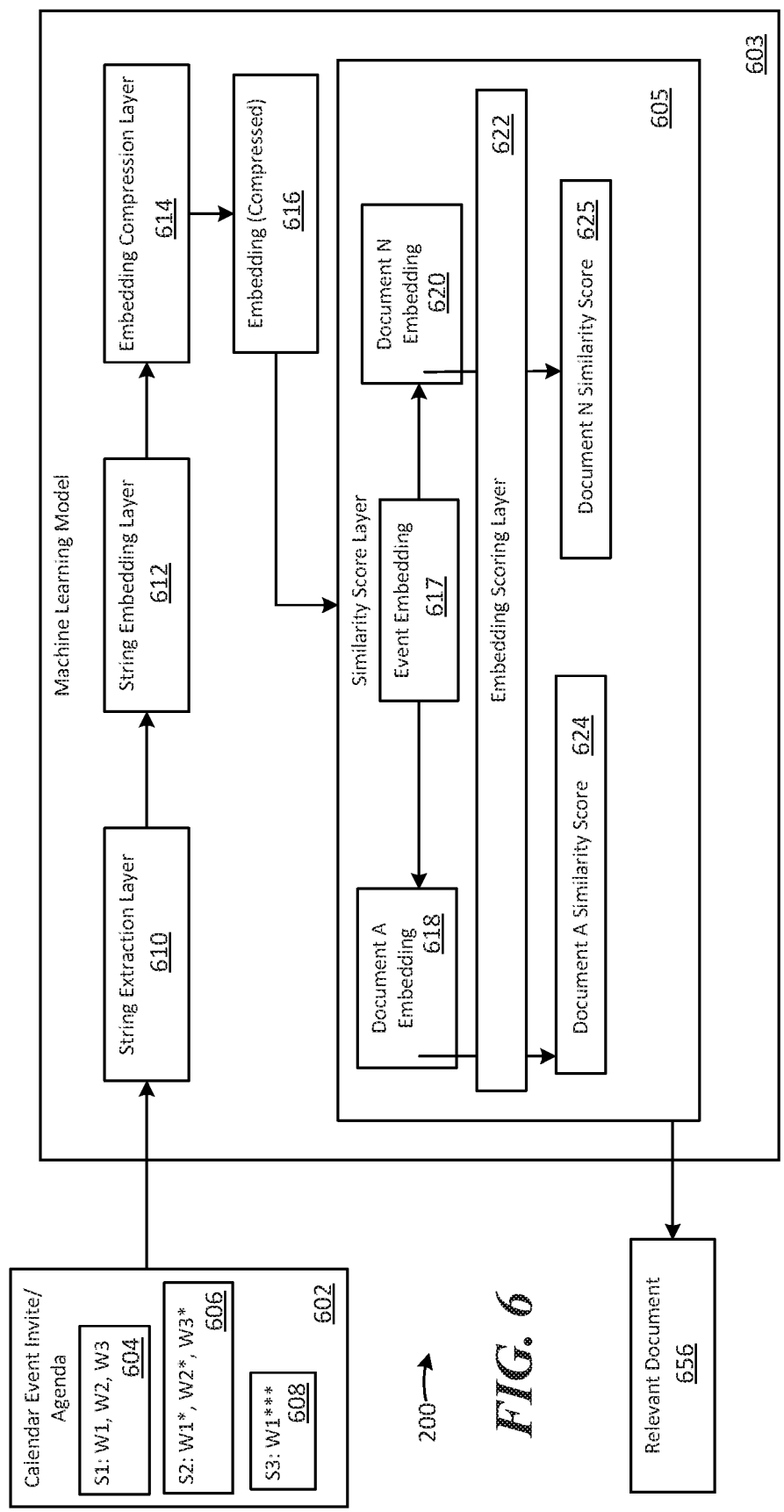
FIG. 6 is a block diagram illustrating an exemplary machine learning model that may be utilized to identify documents that are relevant to electronic calendar events.

FIG. 6 is a block diagram 600 illustrating an exemplary machine learning model that may be utilized to identify documents that are relevant to electronic calendar events. Block diagram 600 includes calendar event invite/agenda 602, machine learning model 603, and relevant document 656.

Calendar event invite/agenda 602 is received by the electronic calendar application service. In the illustrated example, calendar event invite/agenda 602 includes three strings (string 1 604, string 2 606, string 3 608). String 1 604 is comprised of three words (W1, W2, W3). String 2 606 is comprised of three words (W1*, W2*, W3*). String 3 608 is comprised of one word (W1***).

Calendar event invite/agenda 602 is received by machine learning model 603. Specifically, calendar event invite/agenda 602 is first processed by string extraction layer 610. String extraction layer 610 may apply one or more rules to identify and tag individual strings from a natural language input included in a document such as calendar event invite/agenda 602 for further processing. For example, a first rule may dictate that any full sentence (e.g., ending with punctuation) is tagged as a string. A second rule may dictate that any set of words over length X be tagged as an individual string. For example, natural language inputs may comprise run-on sentences that can be better and/or more efficiently further processed if broken up into strings for individual processing. In this example, string extraction layer 610 identifies and tags string 1 604, string 2 606, and string 3 608.

From string extraction layer 610, the strings are passed to string embedding layer 612. String embedding layer 612 comprises a language embedding model. The language embedding model creates an embedding for each string. Thus, a first embedding is generated for string 1 604, a second embedding is generated for string 2 606, and a third embedding is generated for string 3 608. The language embedding model may comprise a contextual embedding model (e.g., a BERT model, an ELMo model, a recurrent neural network model, a long short term memory (LSTM) model, a gated recurrent units (GRU) model). In some examples, the embeddings for each of the strings of calendar event invite/agenda 202 may be combined into a single embedding for the document as a whole.

The embeddings generated at string embedding layer 612 may then be passed to embedding compression layer 614. Embedding compression layer 614 may comprise a model for transforming a continuous embedding generated for a string by string embedding layer 612 into a binary form. As examples, embedding compression layer 614 may comprise one or more of: a direct binarization with a hard threshold model, reducing the dimensionality with either a random projection or principal component analysis model, and/or an encoding-decoding framework with an additional semantic-preserving loss model.

The compressed (binary) embedding for each string (or for the invite/agenda document as a whole) is represented by compressed embedding element 616. In some examples, the embeddings and/or compressed embeddings for the strings may be combined into a single embedding for calendar event invite/agenda 602, as represented by event embedding 617. The compressed embedding is then incorporated in an embedding library comprised of a plurality of language embeddings for other documents (e.g., document A embedding 618, document N embedding 620) associated with a same user account. Similarity scores may be calculated via application of a similarity score model to the new embeddings from the newly embedded strings or the newly embedded document as a whole, and one or more of the embeddings from the embedding library (e.g., document A embedding 618, document N embedding 620). In some examples, the similarity score model may be a cosine model. In other examples, the similarity score model may be a Hamming model. In this example, this is illustrated by similarity score layer 605.

A similarity score may be calculated between each embedded string (or event embedding 617 for the document as a whole) and an embedding for document A embedding 618. The scoring and calculation are illustrated by embedding scoring layer 622. Thus, a similarity score, such as document A similarity score 624, may be calculated for one or more of the strings included in calendar event invite/agenda 602 and document A embedding 618. In some examples, the embeddings for each of the strings of calendar event invite/agenda 602 may be combined into a single embedding for the document as a whole, as illustrated by event embedding 617, and the similarity score may be calculated between that single embedding and the embeddings for the previously-embedded documents.

A similarity score may also be calculated between each embedded string (or event embedding 617 for the document as a whole) and an embedding for document N embedding 620. The scoring and calculation are illustrated by embedding scoring layer 622. Thus, a similarity score, such as document N similarity score 625, may be calculated for one or more strings included in calendar event invite/agenda 602 and document N embedding 620. In some examples, the embeddings for each of the strings of calendar event invite/agenda 602 may be combined into a single embedding for the document as a whole, as illustrated by event embedding 617, and the similarity score may be calculated between that single embedding and the embeddings for the previously-embedded documents.

Relevant document 656 may correspond to one or more highest scored documents from similarity score layer 605. Relevant document 656 may be caused to be surfaced in association with an event context window for an electronic calendar event. In some examples, relevant document 656 may only be surfaced in an event context window if the similarity score for that document (e.g., document A similarity score 624, document N similarity score 625) is above a threshold value.

Figure 7:
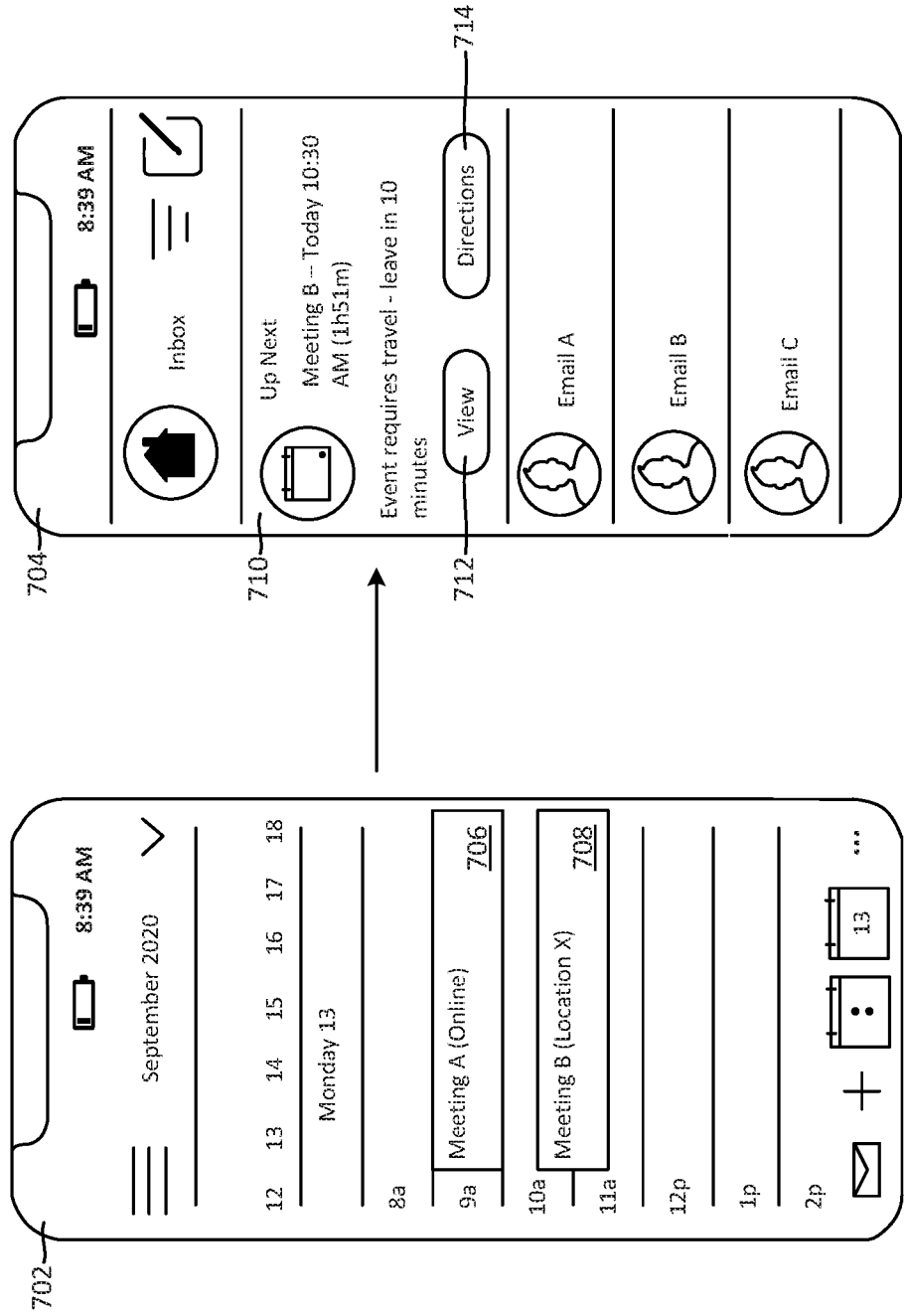
FIG. 7 illustrates the identification and surfacing of contextual information related to electronic calendar events, including the prioritization of contextual information related to an electronic calendar event that requires travel to attend.

FIG. 7 illustrates the identification and surfacing of contextual information related to electronic calendar events, including the prioritization of contextual information related to an electronic calendar event that requires travel to attend. FIG. 7 includes computing device 702 and computing device 704. Computing device 702 and computing device 704 may be the same or different computing devices. Computing device 702 and computing device 704 are each associated with a same specific user account. Computing device 702 displays an electronic calendar application associated with an electronic calendar application service and the specific user account. Computing device 704 displays an email application that is also associated with the specific user account.

The electronic calendar application on computing device 702 displays electronic calendar events for the user account on Monday Sep. 13, 2020. The electronic calendar events for the user of that account include first calendar event 706 ("Meeting A"), which is a one hour meeting starting at 9:00 AM, and second calendar event 708 ("Meeting B"), which is an hour long meeting starting at 10:30 AM. Second calendar event 708 is associated with a location ("[Location X]").

Computing device 704 has the displayed email application open at 8:39 AM on September 13. The electronic calendar application service determines (e.g., via application of a rules engine, via application of an event priority engine, via application of one or more machine learning models, via application of one or more action engines) whether contextual information associated with one or more electronic calendar events should be surfaced in the email application user interface. For example, the electronic calendar application service may determine that second calendar event 708 begins within a threshold period of time of the current time (e.g., within two hours, within three hours), that second calendar event 708 has been accepted, that second calendar event 708 has not been cancelled, and that second calendar event 708 is not an all-day meeting. In some examples, the electronic calendar application service may only surface contextual information associated with a calendar event if all of those criteria are met and an estimated travel time to the location corresponding to the calendar event exceeds the time remaining until the event starts, or in this case, until a different preceding event starts (e.g., first calendar event 706); the electronic calendar event started within a threshold period of time (e.g., the last five minutes, the last ten minutes), or the electronic calendar event starts within a threshold period of time (e.g., next thirty minutes, next forty-five minutes).

In this example, the electronic calendar application service determines that second calendar event 708 meets surfacing parameters. For example, based on application of one or more rules and/or filtering criteria described above, the electronic calendar application may have calculated an event priority score for second calendar event 708 and determined that the event priority score is above a surfacing threshold value. As such, the electronic calendar application services causes event context window 710 to be displayed by computing device 704. In this example, event context window 710 is displayed in the email application above the most current email. However, event context window 710 may be displayed in a different application, as a widget, and/or as part of an operating system shell surface. Event context window 710 includes the description "Up Next", the title of second calendar event 708 ("Meeting B"), an indication of how long before second calendar event 708 begins (1 h 51 m), the time that second calendar event 708 begins (10:30 AM), an indication that second calendar event 708 is going to require travel to attend ("Event requires travel"), and a suggested time for leaving the user's current location (e.g., the current location of computing device 704) for second calendar event 708 (e.g., Location X) ("leave in 10 minutes"). In some examples, the suggested time for leaving the user's current location may be based on the preceding event start time. For example, the electronic calendar application service may determine that the user can arrive from her current location (e.g., home) to the office where location X is before first calendar event 706 begins at 9:00 AM if she leaves in 10 minutes.

Event context window 710 also includes first selectable user interface element 712 ("View") and second selectable user interface element 714 ("Directions"). Selection of first selectable user interface element 712 may cause additional information related to second calendar event 708 to be surfaced (e.g., the calendar event itself may be surfaced in the electronic calendar application, the calendar event itself may be surfaced in event context window 710, documents that have been identified as being relevant to second calendar event 708 may be surfaced, etc.). Selection of second selectable user interface element 714 may cause a map application to open on computing device 704 with directions automatically populated for getting to the location corresponding to second calendar event 708 (Location X). In other examples, selection of second selectable user interface element 714 may cause the directions to be surfaced in event context window 710. In still additional examples, if the user account associated with computing device 704 and the email application has a determined history of utilizing a transportation service (e.g., a ride share service, subway system) selection of second selectable user interface element 714 may cause an application associated with that service to automatically opened and/or populate the application associated with that service with relevant details for traveling to the location associated with second calendar event 708.

In this example, although the start time for second calendar event 708 is after the start time of first calendar event 706, contextual information related to second calendar event 708 is nonetheless surfaced rather than for first calendar event 706 because of the travel time necessary to make it to the location associated with second calendar event 708, and because first calendar event 706 is an online meeting. Thus, an event priority score calculated for second calendar event 708 is above a surfacing threshold value, and an event priority score calculated for first calendar event 706 is below a surfacing threshold value.

FIG. 8 illustrates the identification and surfacing of contextual information related to back-to-back electronic calendar events. FIG. 8 includes computing device 802 and computing device 804. Computing device 802 and computing device 804 may be the same or different computing devices. Computing device 802 and computing device 804 are each associated with a same specific user account. Computing device 802 displays an electronic calendar application associated with an electronic calendar application service and the specific user account. Computing device 804 displays an email application that is also associated with the specific user account.

The electronic calendar application on computing device 802 displays electronic calendar events for the user account on Monday Sep. 12, 2020. The electronic calendar events for the user of that account include first calendar event 806 ("Meeting A"), which is a thirty minute meeting starting at 10:30 AM, and second calendar event 808 ("Meeting B"), which is an hour long meeting starting at 11:00 AM.

Computing device 804 has the displayed email application open at 10:40 AM on September 13. The electronic calendar application service determines (e.g., via application of a rules engine, via application of an event priority engine, via application of one or more machine learning models, via application of one or more action engines) whether contextual information associated with one or more electronic calendar events should be surfaced in the email application user interface.

The electronic calendar application service may determine that first calendar event 806 has been accepted, that first calendar event 806 has not been cancelled, and that first calendar event 806 is not an all-day meeting. In some examples, the electronic calendar application service may only surface contextual information associated with a calendar event if all of those criteria are met and an estimated travel time to the location corresponding to the calendar event exceeds the time remaining until the event starts, the electronic calendar event started within a threshold period of time (e.g., the last five minutes, the last ten minutes, the last fifteen minutes), or the electronic calendar event starts within a threshold period of time (e.g., next thirty minutes, next forty-five minutes). One or more of these criteria may be utilized in calculating an event priority score for determining whether an electronic calendar event is to be surfaced. In this example, the first set of criteria are met (e.g., the meeting invite has been accepted, the meeting is on the user's calendar, the meeting has not been cancelled, and the meeting is not an all-day meeting), and the second criteria is also met (e.g., first calendar event 806 started within a threshold period of time). As such, an event priority score for first calendar event 806 is above a threshold value and event context window 810 is thus surfaced on computing device 804.

Event context window 810 includes the description "Up Next", the title of first calendar event 806 ("Meeting A"), an indication of how long before first calendar event 706 starts (in this case it already started so "Now" and the time that it started), and an indication of the duration of the meeting (30 m). Event context window 810 also includes selectable user interface element 813 ("View"). Selection of selectable user interface element 813 may cause additional information related to first calendar event 806 to be surfaced.

The electronic calendar application may determine that second calendar event 808 has been accepted, that second calendar event 808 has not been cancelled, and that second calendar event 808 is not an all-day meeting. In some examples, the electronic calendar application service may only surface contextual information associated with a calendar event if all of those criteria are met and an estimated travel time to the location corresponding to the calendar event exceeds the time remaining until the event starts, the electronic calendar event started within a threshold period of time (e.g., the last five minutes, the last ten minutes, the last fifteen minutes), or the electronic calendar event starts within a threshold period of time (e.g., next thirty minutes, next forty-five minutes). One or more of these criteria may be utilized in calculating an event priority score for determining whether an electronic calendar event is to be surfaced. In this example, the first set of criteria are met (e.g., the meeting invite has been accepted, the meeting is on the user's calendar, the meeting has not been cancelled, and the meeting is not an all-day meeting), and the second criteria is also met (e.g., second calendar event 808 is going to start within a threshold period of time). As such, an event priority score for second calendar event 808 is also above a threshold value and event context window 815 is thus surfaced on computing device 804.

Event context window 815 includes the description "Up Next", the title of second calendar event ("Meeting B"), an indication how long before second calendar event 808 begins (in 20 min), and the time that second calendar event 808 begins (11:00 AM). Event context window 815 also includes first selectable user interface element 812 ("View") and second selectable user interface element 814 ("Prereads"). Selection of first selectable user interface element 812 may cause additional information related to second calendar event 808 to be surfaced. Selection of second selectable user interface element 814 may cause one or more documents that have been determined to be relevant to second calendar event 808 to be surfaced.

Figure 9A:
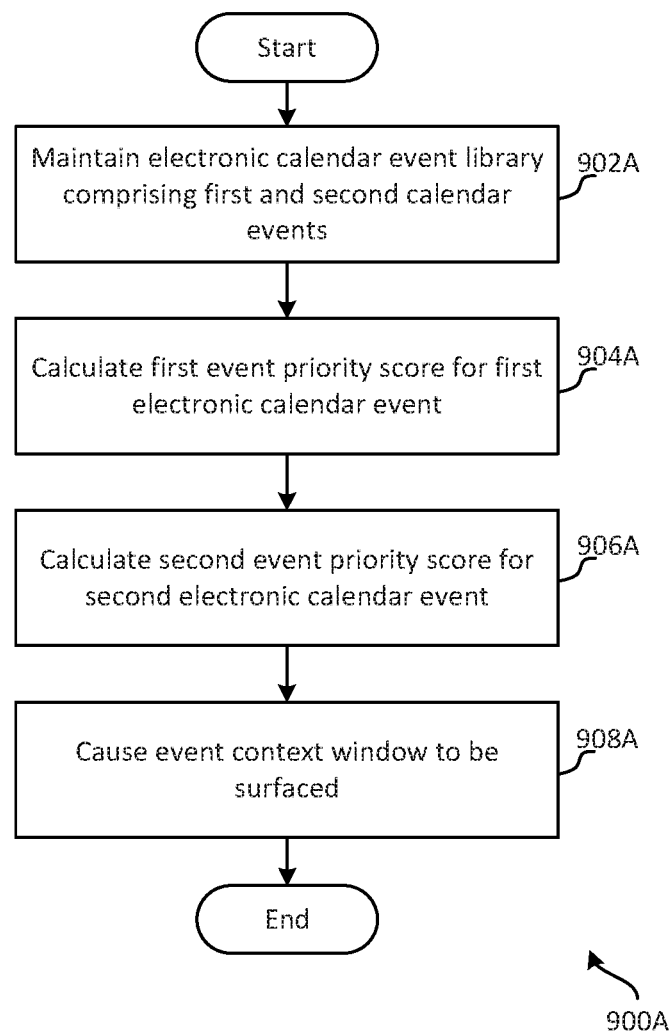
FIG. 9A is an exemplary method for surfacing content related to electronic calendar events.

FIG. 9A is an exemplary method 900A for surfacing content related to electronic calendar events. The method 900A begins at a start operation and flow moves to operation 902A.

At operation 902A an electronic calendar event library is maintained. The electronic calendar event library may comprise a first electronic calendar event associated with a first user account, the first electronic calendar event scheduled for a first time. The electronic calendar event library may further comprise a second electronic calendar event associated with the first user account, the second electronic calendar event scheduled for a second time. In some examples, the electronic calendar event library may be stored locally on a client computing device. In other examples, the electronic calendar event library may be maintained remotely in cloud storage. In additional examples, the electronic calendar event library may be maintained locally and remotely. The first time and the second time may be future times. In other examples, the first time may be within a threshold duration of the current time (past or future). In additional examples, the second time may be within a threshold duration of the current time (past or future).

From operation 902A flow continues to operation 904A where a first event priority score for the first electronic calendar event is calculated. The first event priority score may be calculated to be above a surfacing threshold value. The event priority score may be calculated based on one or more criteria. In some examples, the one or more criteria may include: whether a meeting invite for the first electronic calendar event has been accepted, whether the first electronic calendar event is on an electronic calendar associated with the first user account, whether the first electronic calendar event has been cancelled, and/or whether the first electronic calendar event is an all-day meeting. In additional examples, the one or more criteria may include whether the first electronic calendar event starts within a threshold period of time (e.g., one hour, two hours, three hours) and whether an estimated travel time to a location associated with the first electronic calendar event exceeds the time remaining until the first electronic calendar event starts; whether the first electronic calendar event started within a threshold period of time (e.g., within the last five minutes, within the last ten minutes); or whether the first electronic calendar event starts within a threshold period of time (e.g., the next thirty minutes, the next forty-five minutes, the next hour). According to additional examples, the event priority score may additionally take into account whether the first electronic calendar event has attendees. For example, if an electronic calendar event has attendees it may have a higher event priority score than an electronic calendar event that does not have attendees.

From operation 904A flow continues to operation 906A where a second event priority score for the second electronic calendar event is calculated. The first event priority score may be higher than the second event priority score. The second event priority score may be calculated based on one or more criteria. In some examples, the one or more criteria may include: whether a meeting invite for the second electronic calendar event has been accepted, whether the second electronic calendar event is on an electronic calendar associated with the first user account, whether the second electronic calendar event has been cancelled, and/or whether the second electronic calendar event is an all-day meeting. In additional examples, the one or more criteria may include whether the second electronic calendar event starts within a threshold period of time (e.g., one hour, two hours, three hours) and whether an estimated travel time to a location associated with the second electronic calendar event exceeds the time remaining until the second electronic calendar event starts; whether the second electronic calendar event started within a threshold period of time (e.g., within the last five minutes, within the last ten minutes); or whether the second electronic calendar event starts within a threshold period of time (e.g., the next thirty minutes, the next forty-five minutes, the next hour). According to additional examples, the event priority score may additionally take into account whether the second electronic calendar event has attendees. For example, if an electronic calendar event has attendees it may have a higher event priority score than an electronic calendar event that does not have attendees.

From operation 906A flow continues to operation 908A where an event context window is caused to be surfaced. The event context window may comprise a selectable user interface element for causing an action associated with the first electronic calendar event to be performed, and contextual information associated with the first electronic calendar event. The action associated with the first calendar event may comprise a location navigation action, a join meeting online action, and/or a surface event pre-read action.

From operation 908A flow moves to an end operation and the method 900A ends.

Figure 9B:
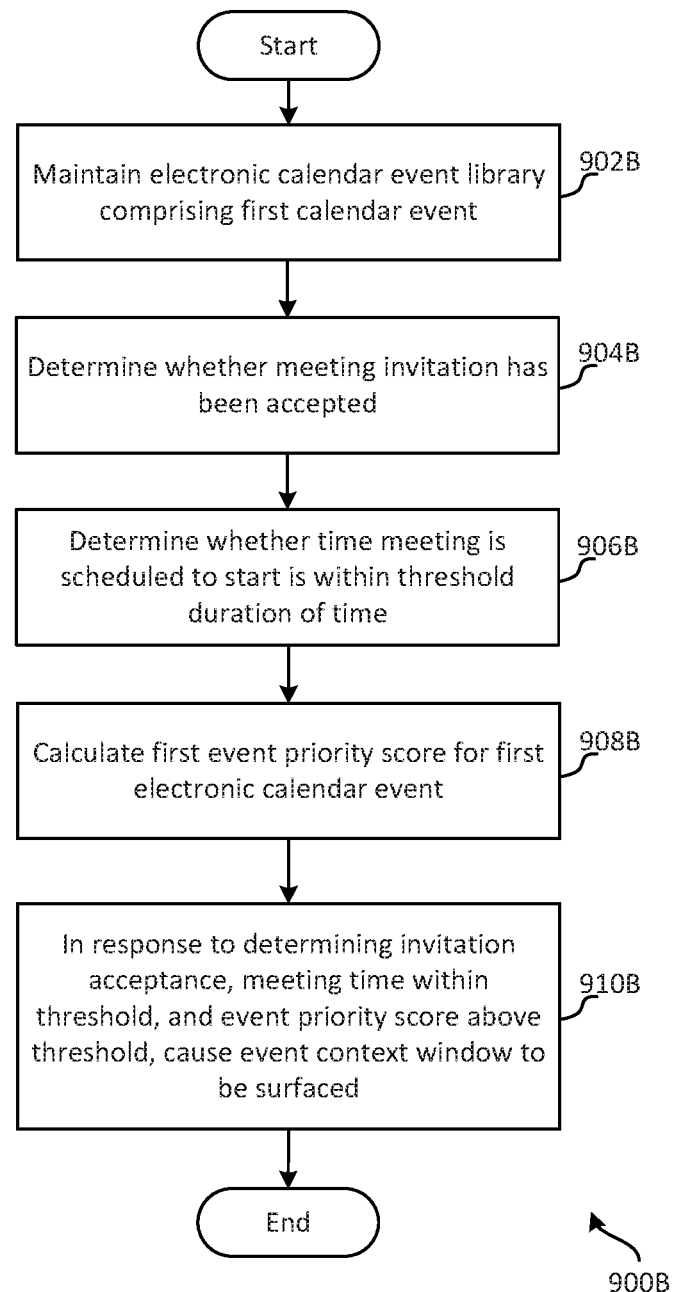
FIG. 9B is another exemplary method for surfacing content related to electronic calendar events.

FIG. 9B is another exemplary method 900B for surfacing content related to electronic calendar events. The method 900B begins at a start operation and flow moves to operation 902B.

At operation 902B an electronic calendar event library comprising a first electronic calendar event associated with a first user account is maintained, the first electronic calendar event scheduled to begin at a first time. In some examples, the electronic calendar event library may be stored locally on a client computing device. In other examples, the electronic calendar event library may be maintained remotely in cloud storage. In additional examples, the electronic calendar event library may be maintained locally and remotely.

From operation 902B flow continues to operation 904B where a determination is made as to whether an electronic meeting invitation for the first electronic calendar event has been accepted. For example, an electronic calendar invitation may be sent from a scheduling user to the first user account, and a determination may be made as to whether the first user account has affirmatively accepted the invitation rather than simply leaving the electronic meeting as "tentative" or affirmatively declining the invitation.

From operation 904B flow continues to operation 906B where a determination is made as to whether the first time is within a threshold duration of time from the current time. The current time may be prior to the meeting being started or after the meeting has started. In some examples, if the current time is prior to the meeting being started, the threshold duration of time may be longer than if the current time is after the meeting has already started. For example, the threshold duration of time may be thirty minutes or one hour if the current time is prior to the meeting being started, and the threshold duration of time may be five minutes or ten minutes if current time is after the meeting has already started.

From operation 906B flow continues to operation 908B where a first event priority score for the first electronic calendar event is calculated. The first event priority score may be calculated to be above a surfacing threshold value. The event priority score may be calculated based on one or more criteria. In some examples, the one or more criteria may include: whether a meeting invite for the first electronic calendar event has been accepted, whether the first electronic calendar event is on an electronic calendar associated with the first user account, whether the first electronic calendar event has been cancelled, and/or whether the first electronic calendar event is an all-day meeting. In additional examples, the one or more criteria may include whether the first electronic calendar event starts within a threshold period of time (e.g., one hour, two hours, three hours) and whether an estimated travel time to a location associated with the first electronic calendar event exceeds the time remaining until the first electronic calendar event starts; whether the first electronic calendar event started within a threshold period of time (e.g., within the last five minutes, within the last ten minutes); or whether the first electronic calendar event starts within a threshold period of time (e.g., the next thirty minutes, the next forty-five minutes, the next hour). According to additional examples, the event priority score may additionally take into account whether the first electronic calendar event has attendees. For example, if an electronic calendar event has attendees it may have a higher event priority score than an electronic calendar event that does not have attendees.

From operation 908B flow continues to operation 910B where an event context window is caused to be surfaced in response to determining that the electronic meeting invitation for the first electronic calendar event has been accepted, determining that the first time is within a threshold duration of time from the current time, and the first event priority score being higher than the surfacing threshold value. The event context window may comprise a selectable user interface element for causing an action associated with the first electronic calendar event to be performed, and contextual information associated with the first electronic calendar event. The action associated with the first calendar event may comprise a location navigation action, a join meeting online action, and/or a surface event pre-read action.

From operation 910B flow moves to an end operation and the method 900B ends.

Figure 10:
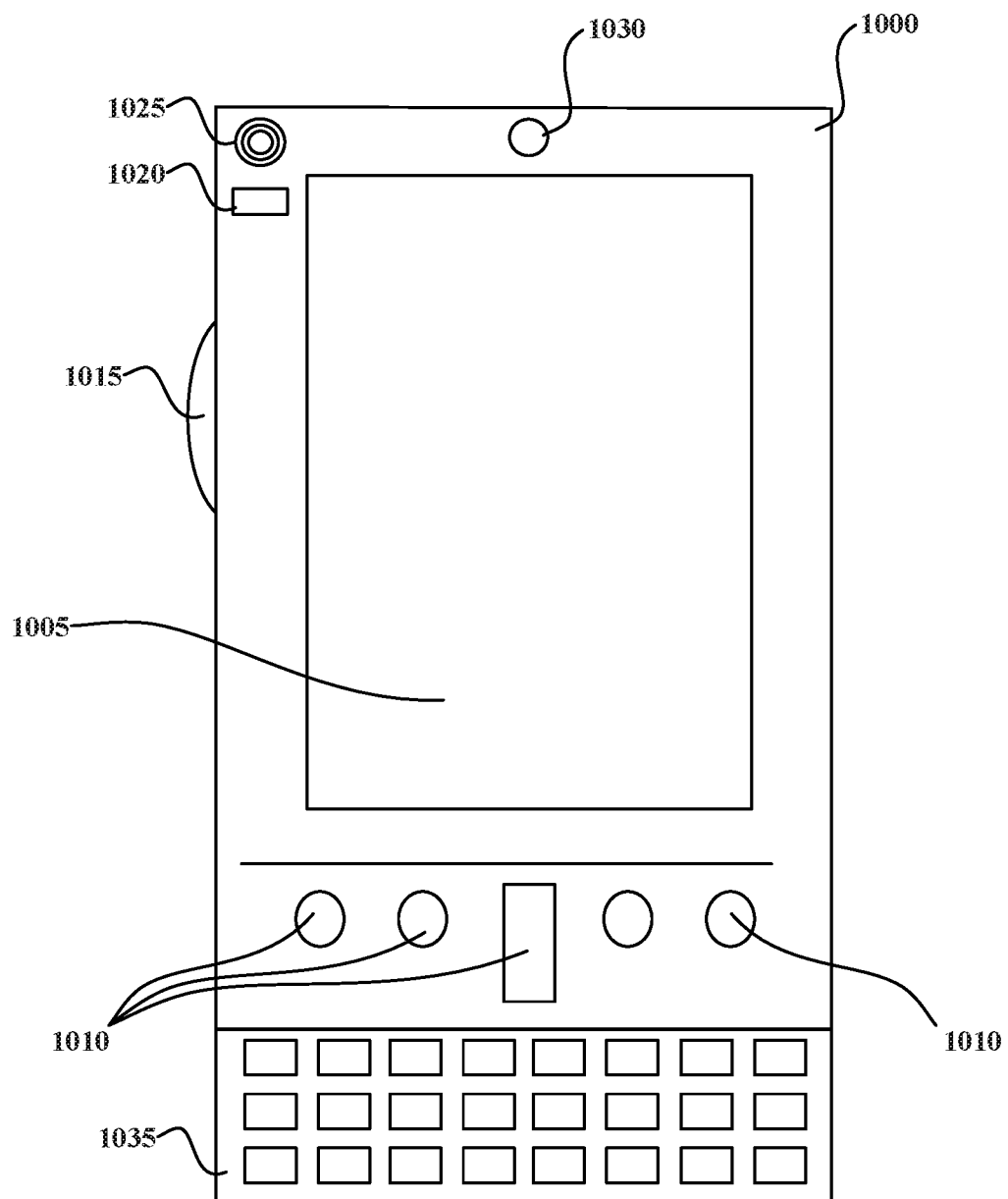
FIGS. 10 and 11 are simplified diagrams of a mobile computing device with which aspects of the disclosure may be practiced.
Figure 11:
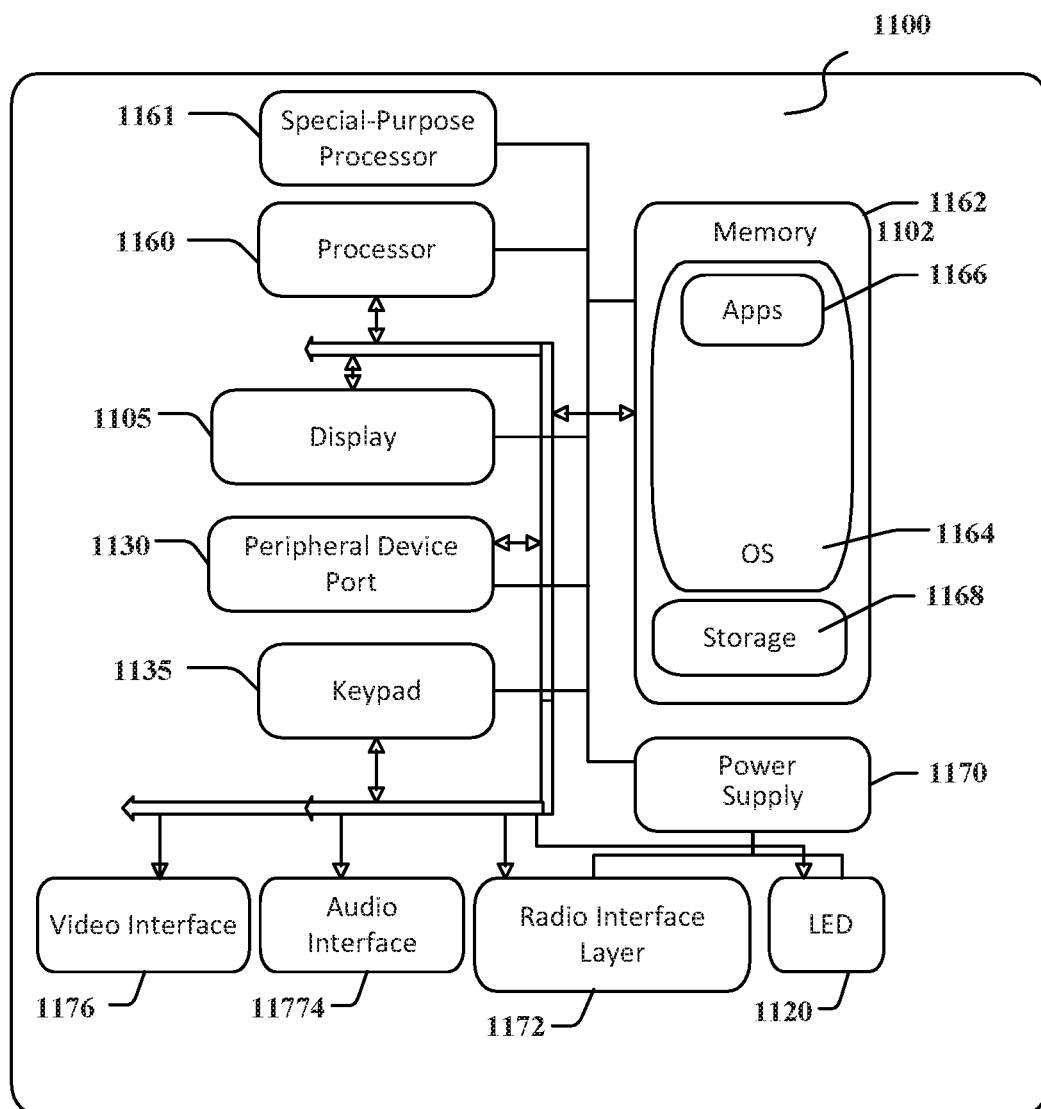

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
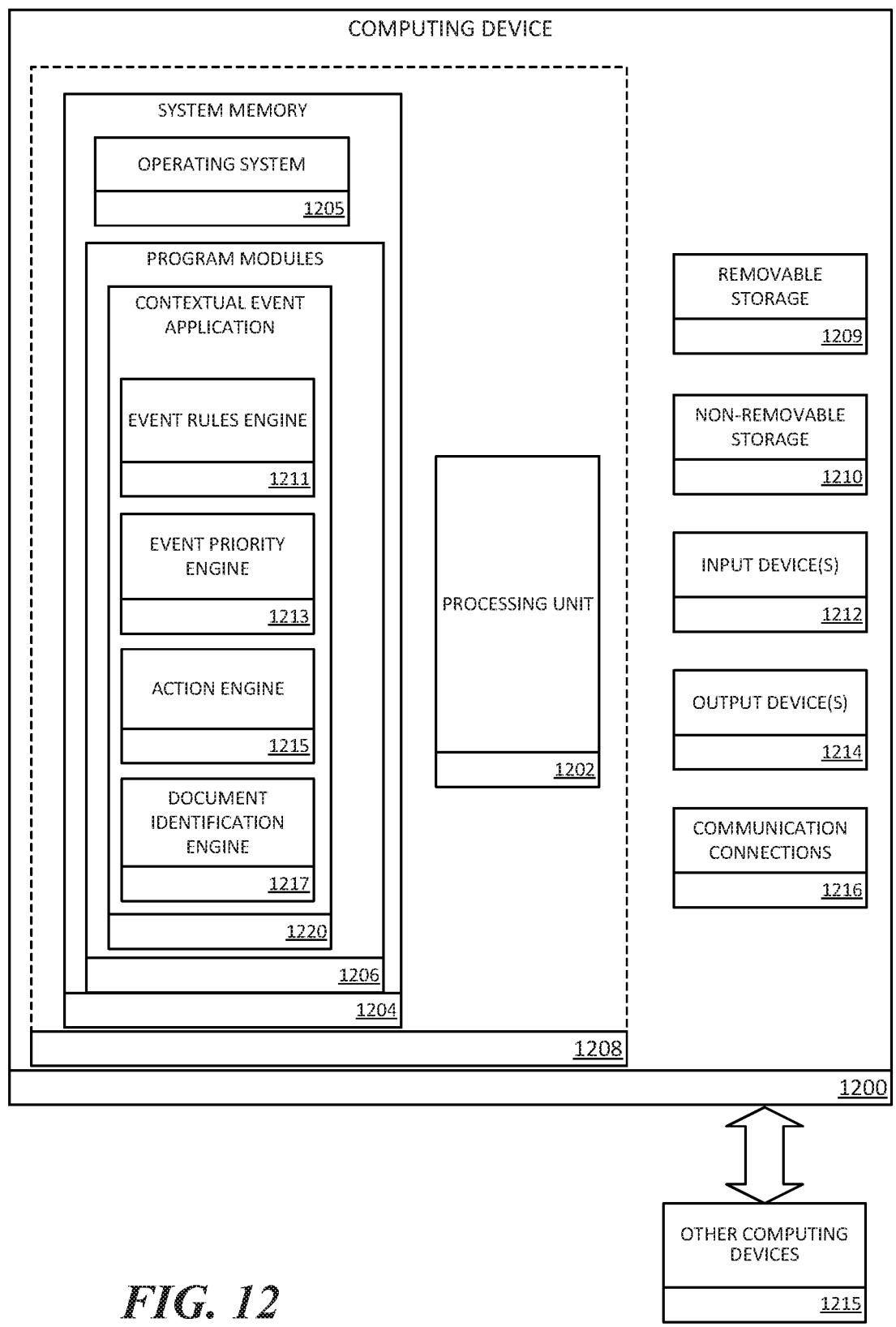
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for generating, surfacing and providing operations associated with electronic calendar events and related contextual information. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more electronic calendar applications and productivity applications. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., contextual event application 1220) may perform processes including, but not limited to, the aspects, as described herein. According to examples, event rules engine 1211 may apply one or more rules to electronic calendar events to determine whether contextual information associated with those events should be surfaced. Event priority engine 1213 may perform one or more operations associated with calculating event priority scores for electronic calendar events and determining whether to surface contextual information associated with those electronic calendar events based on those event priority scores. In some examples, event priority engine 1213 may calculate event priority scores based on the application of one or more rules by rules engine 1211. Action engine 1215 may perform one or more operations associated with determining whether to surface one or more selectable user interface elements for causing an action to be performed in association with a surfaced event context window for an electronic calendar event. Document identification engine 1217 may perform one or more operations associated with applying one or more machine learning models to documents related to an electronic calendar event invitation and/or agenda to determine whether there are relevant pre-reads to surface in association with an event context window for the electronic calendar event.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal. Similarly, computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
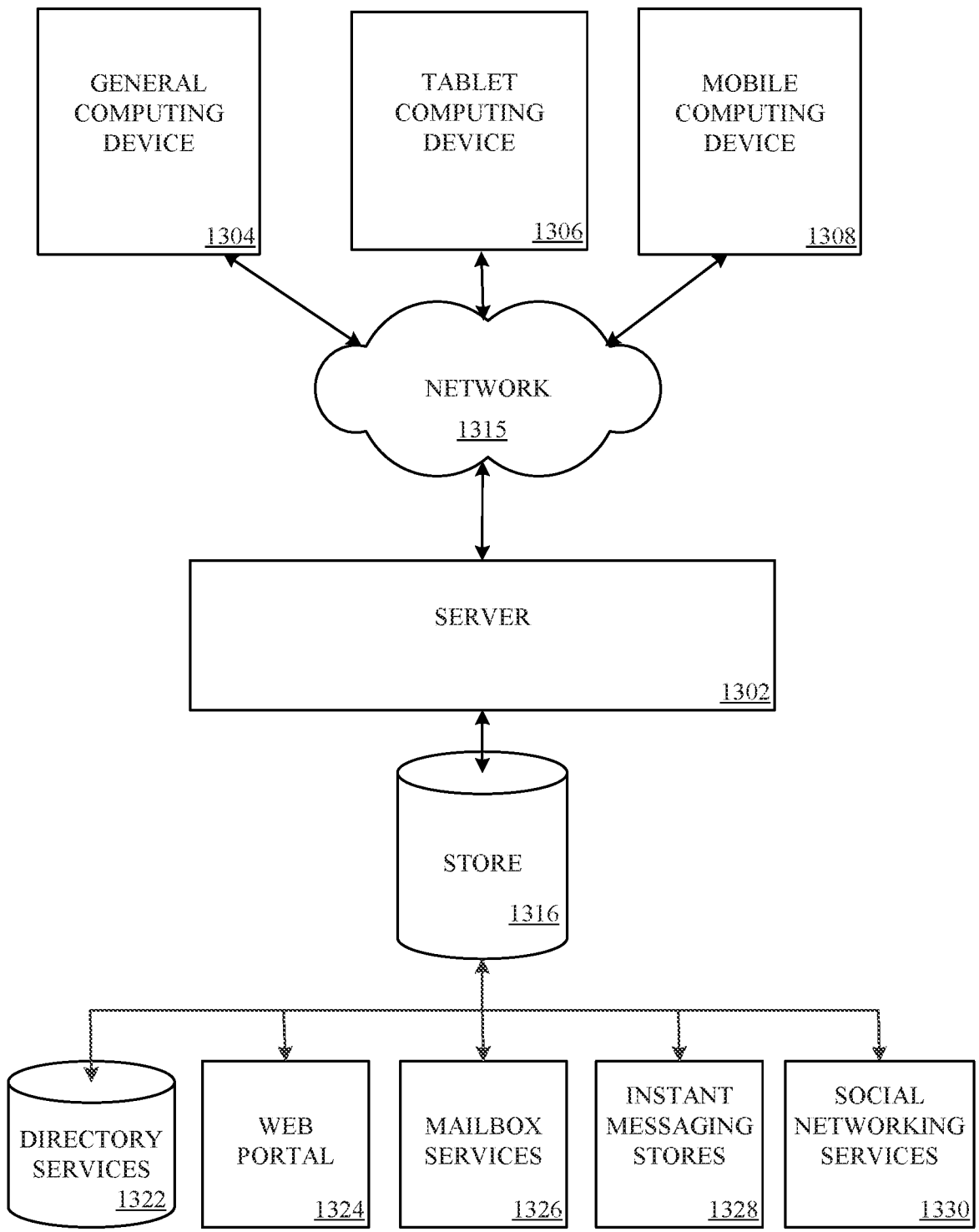
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for surfacing content related to electronic calendar events, the method comprising:

maintaining an electronic calendar event library comprising a first electronic calendar event associated with a first user account, the first electronic calendar event scheduled to begin at a first time and scheduled to take place at a specific geographic location;

determining an estimated travel time between a geographic location of a computing device associated with the first user account and the specific geographic location;

determining a duration of time between a current time and the first time;

determining a difference in duration between the estimated travel time and the duration of time between the current time and the first time;

determining whether an electronic meeting invitation for the first electronic calendar event has been accepted;

calculating, based at least in part on the determined difference in duration between the estimated travel time and the duration of time between the current time and the first time, a first event priority score for the first electronic calendar event, wherein an event priority score is higher when an estimated duration of travel time to an event location approaches a duration of time between a current time and an event start time, and the event priority score is lower when the estimated duration of travel time to the event location is farther away from the duration of time between the current time and the event start time;

determining whether the first event priority score is above a surfacing threshold value;

in response to:
 determining that the electronic meeting invitation for the first electronic calendar event has been accepted, and
 determining that the first event priority score is above the surfacing threshold value,
 causing an event context window to be surfaced, the event context window comprising:
  a selectable user interface element for causing an action associated with the first electronic calendar event to be performed, and
  contextual information associated with the first electronic calendar event.

2. The computer-implemented method of claim 1, wherein the action associated with the first electronic calendar event comprises a location navigation action.

3. The computer-implemented method of claim 1, further comprising:
 receiving a selection of the selectable user interface element; and
 causing directions from the geographic location of the computing device to the specific geographic location to be surfaced on the computing device associated with the first user account.

4. The computer-implemented method of claim 1, further comprising:
 determining that the user cannot travel from the geographic location of the computing device to the specific geographic location before the first electronic calendar event begins;
 receiving a selection of the selectable user interface element; and
 in response to receiving the selection, causing the computing device associated with the first user account to join the first electronic calendar event online.

5. The computer-implemented method of claim 1, wherein the action associated with the first electronic calendar event comprises a surface event pre-read action.

6. The computer-implemented method of claim 5, further comprising:

identifying a plurality of electronic documents associated with the first electronic calendar event; and calculating a pre-read score for each of the plurality of electronic documents.

7. The computer-implemented method of claim 6, further comprising:
 receiving a selection of the selectable user interface element; and
 in response to receiving the selection, causing one of the plurality of electronic documents with a highest pre-read score to be surfaced.

8. The computer-implemented method of claim 6, wherein identifying the plurality of electronic documents associated with the first electronic calendar event comprises identifying a connection between two or more attributes associated with the electronic meeting invitation, and wherein the two or more attributes are selected from a group comprising: invitees included in the electronic meeting invitation, attachments included in the electronic meeting invitation, and a subject line of the electronic meeting invitation.

9. The computer-implemented method of claim 6, wherein calculating the pre-read score for each of the plurality of electronic documents comprises applying a machine learning model to each of the plurality of electronic documents.

10. The computer-implemented method of claim 9, wherein the machine learning model comprises at least one of a language embedding model or a similarity score model.

11. The computer-implemented method of claim 9, wherein calculating the pre-read score for each of the plurality of electronic documents further comprises applying the machine learning model to the electronic meeting invitation.

12. The computer-implemented method of claim 1, wherein the electronic calendar event library further comprises a second electronic calendar event associated with the first user account, the second electronic calendar event scheduled to begin at a second time, and wherein the method further comprises:
 calculating a second event priority score for the second electronic calendar event, wherein the second event priority score is above the surfacing threshold value;
 receiving an input for dismissing the first event context window;
 causing the first event context window to be dismissed;
 in response to the second event priority score being above the surfacing threshold value and the first event context window being dismissed, causing a second event context window to be surfaced, the second event context window comprising:
  a second selectable user interface element for causing an action associated with the second electronic calendar event to be performed; and
  second contextual information associated with the second electronic calendar event.

13. The computer-implemented method of claim 1, wherein the contextual information associated with the first electronic calendar event included in the event context window comprises:
 temporal information associated with the first electronic calendar event; and
 locational information associated with the first electronic calendar event.

14. The computer-implemented method of claim 1, wherein the electronic calendar event library further comprises a second electronic calendar event associated with the first user account, the second electronic calendar event scheduled to begin at a second time, and wherein the method further comprises:
    calculating a second event priority score for the second electronic calendar event, wherein the second event priority score is above the surfacing threshold value;
    in response to the second event priority score being above the surfacing threshold value, causing a second event context window to be surfaced, the second event context window comprising:
        a second selectable user interface element for causing an action associated with the second electronic calendar event to be performed; and
        second contextual information associated with the second electronic calendar event.

15. The computer-implemented method of claim 14, wherein:
    the first event priority score is greater than the second event priority score; and
    the first event context window is caused to be surfaced above the second event context window based on the first event priority score being greater than the second event priority score.

16. A system for surfacing content related to electronic calendar events, comprising:
    a memory for storing executable program code; and
    processor, functionally coupled to the memory, the processor being responsive to computer-executable instructions contained in the program code and operative to:
        maintain an electronic calendar event library comprising a first electronic calendar event associated with a first user account, the first electronic calendar event scheduled to begin at a first time and scheduled to take place at a specific geographic location;
        determine an estimated travel time between a geographic location of a computing device associated with the first user account and the specific geographic location;
        determine a duration of time between a current time and the first time;
        determine a difference in duration between the estimated travel time and the duration of time between the current time and the first time;
        determine whether an electronic meeting invitation for the first electronic calendar event has been accepted;
        calculate, based at least in part on the determined difference in duration between the estimated travel time and the duration of time between the current time and the first time, a first event priority score for the first electronic calendar event, wherein an event priority score is higher when an estimated duration of travel time to an event location approaches a duration of time between a current time and an event start time, and the event priority score is lower when the estimated duration of travel time to the event location is farther away from the duration of time between the current time and the event start time;
        determining whether the first event priority score is above a surfacing threshold value;
        in response to:
            determining that the electronic meeting invitation for the first electronic calendar event has been accepted, and
            determining that the first event priority score is above the surfacing threshold value,
        cause an event context window to be surfaced, the event context window comprising:
            a selectable user interface element for causing an action associated with the first electronic calendar event to be performed, and
            contextual information associated with the first electronic calendar event.

17. The system of claim 16, wherein the electronic calendar event library further comprises a second electronic calendar event associated with the first user account, the second electronic calendar event scheduled to begin at a second time, and wherein the processor is further responsive to the computer executable instructions contained in the program code and operative to:
    calculate a second event priority score for the second electronic calendar event, wherein the second event priority score is above the surfacing threshold value;
    receive an input for dismissing the first event context window;
    in response to the second event priority score being above the surfacing threshold value and the first event context window being dismissed, cause a second event context window to be surfaced, the second event context window comprising:
        a second selectable user interface element for causing an action associated with the second electronic calendar event to be performed; and
        second contextual information associated with the second electronic calendar event.

18. The system of claim 16, wherein the processor is further responsive to the computer-executable instructions contained in the program code and operative to:
    identify a plurality of documents associated with the first electronic calendar event; and
    calculate a pre-read score for each of the plurality of electronic documents.

19. The system of claim 18, wherein the processor is further responsive to the computer-executable instructions contained in the program code and operative to:
    receive a selection of the selectable user interface element; and
    in response to receiving the selection, cause one of the plurality of electronic documents with a highest pre-read score to be surfaced.

20. A non-transitory computer-readable storage device comprising executable instructions that, when executed by a processor, assist with surfacing content related to electronic calendar events, the computer-readable storage device including instructions executable by the processor for:
    maintaining an electronic calendar event library comprising:
        a first electronic calendar event associated with a first user account, wherein the first electronic calendar event is scheduled to begin at a first time and take place at a specific geographic location, and wherein the first electronic calendar event is scheduled for a specific duration of time;
    determining an estimated travel time between a geographic location of a computing device associated with the first user account and the specific geographic location;
    determining a duration of time between a current time and the first time;
    determining a difference in duration between the estimated travel time and the duration of time between the current time and the first time;

determining whether a meeting invitation for the first electronic calendar event has been accepted;

calculating, based at least in part on the determined difference in duration between the estimated travel time and the duration of time between the current time and the first time, a first event priority score for the first electronic calendar event, wherein an event priority score is higher when an estimated duration of travel time to an event location approaches a duration of time between a current time and an event start time, and the event priority score is lower when the estimated duration of travel time to the event location is farther away from the duration of time between the current time and the event start time;

determining whether the first event priority score is above a surfacing threshold value;

in response to:
   determining that the meeting invitation for the first electronic calendar event has been accepted, and
   determining that the first event priority score is above the surfacing threshold value, causing an event context window to be surfaced, the event context window comprising:
   a selectable user interface element for causing an action associated with the first electronic calendar event to be performed, and
   contextual information associated with the first electronic calendar event.

* * * * *